US006288753B1

United States Patent
DeNicola et al.

(10) Patent No.: US 6,288,753 B1
(45) Date of Patent: Sep. 11, 2001

(54) SYSTEM AND METHOD FOR LIVE INTERACTIVE DISTANCE LEARNING

(75) Inventors: Cosmo T. DeNicola, Newtown; Mark E. Handzlik, Jamison; John D. Kelliher, Yardley; William M. Fantini, Media; Gary Weber, Holland, all of PA (US)

(73) Assignee: Corrugated Services Corp., Bensalem, PA (US)

( * ) Notice: Subject to any disclaimer, the term of this patent is extended or adjusted under 35 U.S.C. 154(b) by 0 days.

(21) Appl. No.: 09/348,892

(22) Filed: Jul. 7, 1999

(51) Int. Cl.$^7$ ............................... H04N 9/74; H04N 7/14
(52) U.S. Cl. .................. 348/586; 348/14.01; 348/14.04; 348/14.07
(58) Field of Search ..................................... 348/584–587, 348/13, 14, 15, 592, 14.01–14.04, 14.07; 379/15, 53

(56) References Cited

U.S. PATENT DOCUMENTS

| | | |
|---|---|---|
| 4,360,827 | 11/1982 | Braun . |
| 4,414,621 | 11/1983 | Bown et al. . |
| 4,609,358 | 9/1986 | Sangster . |
| 4,622,013 | 11/1986 | Cerchio . |
| 4,650,929 | 3/1987 | Boerger et al. . |
| 4,652,240 | 3/1987 | Wackym . |
| 4,710,917 | 12/1987 | Tompkins et al. . |
| 4,715,818 | 12/1987 | Shapiro et al. . |
| 4,785,472 | 11/1988 | Shapiro . |
| 4,811,084 * | 3/1989 | Belmares-Sarabia et al. ...... 348/592 |
| 4,882,743 | 11/1989 | Mahmoud . |
| 4,935,953 * | 6/1990 | Appel et al. ........................... 379/53 |
| 5,059,127 | 10/1991 | Lewis et al. . |
| 5,176,520 | 1/1993 | Hamilton . |

(List continued on next page.)

OTHER PUBLICATIONS

Unknown Educational Achievement Testing (http:://www.edutest.com) 1999 2 pgs.

Primary Examiner—Reinhard J. Eisenzopf
Assistant Examiner—Linus H. Lo
(74) Attorney, Agent, or Firm—Caesar, Rivise, Bernstein, Cohen & Pokotilow, Ltd.

(57) ABSTRACT

A system and method for an interactive, Internet-based videoconferencing multicast operation which utilizes a video production studio with a live instructor giving lectures in real-time to multiple participating students. The videoconference multicasting permits the students to interact with the instructor and other installations during the course of the lecture. In the case of software training, the system and method also utilize Internet-based application sharing and collaboration to permit the students at remote locations to drive a studio-based computer with the software for which the training is being given. The software screen is then used as a background with the instructor being able to literally point to areas of the screen which are being discussed. The instructor has a set of monitors in the studio which allow him/her to see the students on-location. In this fashion, the students can see at their computer screens the instructor "walking" around their computer screen pointing at various items in the screen. Furthermore, a system and method for on-line testing, evaluation and reporting is disclosed wherein test questions, which can be created on the fly by a test administrator, are stored in a database and associated with one or more test numbers and whereby each time a student requests to take a test, the test is "built" and the order of the questions is randomized to avoid cheating. Test evaluation data is cross-correlated and made instantaneously available to students and their sponsoring employer.

2 Claims, 18 Drawing Sheets

U.S. PATENT DOCUMENTS

| | | |
|---|---|---|
| 5,180,309 | 1/1993 | Egnor . |
| 5,204,813 | 4/1993 | Samph et al. . |
| 5,206,934 | 4/1993 | Naef, III . |
| 5,239,373 | 8/1993 | Tang et al. . |
| 5,257,306 | 10/1993 | Watanabe . |
| 5,259,766 | 11/1993 | Sack et al. . |
| 5,263,869 | 11/1993 | Ziv-El . |
| 5,272,526 | 12/1993 | Yoneta et al. . |
| 5,283,638 | 2/1994 | Engberg et al. . |
| 5,283,819 | 2/1994 | Glick et al. . |
| 5,303,042 | 4/1994 | Lewis et al. . |
| 5,310,349 | 5/1994 | Daniels et al. . |
| 5,321,611 | 6/1994 | Clark et al. . |
| 5,325,423 | 6/1994 | Lewis . |
| 5,347,306 * | 9/1994 | Nitta ........................................ 348/15 |
| 5,395,243 | 3/1995 | Lubin et al. . |
| 5,421,730 | 6/1995 | Lasker, III et al . |
| 5,437,555 | 8/1995 | Ziv-El . |
| 5,453,780 * | 9/1995 | Chen et al. ............................ 348/15 |
| 5,458,493 | 10/1995 | Clark et al. . |
| 5,491,508 | 2/1996 | Friedell et al. . |
| 5,500,684 * | 3/1996 | Uya ........................................ 348/592 |
| 5,506,954 | 4/1996 | Arshi et al. . |
| 5,513,994 | 5/1996 | Kershaw et al. . |
| 5,537,141 | 7/1996 | Harper et al. . |
| 5,576,844 | 11/1996 | Anderson et al. . |
| 5,577,208 | 11/1996 | Couturier . |
| 5,587,928 | 12/1996 | Jones et al. . |
| 5,594,494 * | 1/1997 | Okada et al. ........................... 348/15 |
| 5,627,978 | 5/1997 | Altom et al. . |
| 5,657,246 | 8/1997 | Hogan et al. . |
| 5,690,497 | 11/1997 | Clark et al. . |
| 5,710,590 * | 1/1998 | Ichige et al. ........................... 348/14 |
| 5,737,011 * | 4/1998 | Lukacs ................................... 348/15 |
| 5,749,736 | 5/1998 | Griswold et al. . |
| 5,752,836 | 5/1998 | Clark et al. . |
| 5,757,418 * | 5/1998 | Inagaki ................................... 348/15 |
| 5,767,897 * | 6/1998 | Howell .............................. 348/14.07 |
| 5,772,446 | 6/1998 | Rosen . |
| 5,797,754 | 8/1998 | Griswold et al. . |
| 5,802,284 | 9/1998 | Karlton et al. . |
| 5,810,605 | 9/1998 | Siefert . |
| 5,820,386 | 10/1998 | Sheppard, II . |
| 5,822,525 | 10/1998 | Tafoya et al. . |
| 5,823,786 | 10/1998 | Easterbrook . |
| 5,823,788 | 10/1998 | Lemelson et al. . |
| 5,827,070 | 10/1998 | Kershaw et al. . |
| 5,833,468 | 11/1998 | Guy et al. . |
| 5,847,709 | 12/1998 | Card et al. . |
| 5,850,250 * | 12/1998 | Konopka et al. .................. 348/14.07 |
| 5,857,189 | 1/1999 | Riddle . |
| 5,867,653 | 2/1999 | Aras et al. . |
| 5,872,923 | 2/1999 | Schwartz et al. . |
| 5,879,165 | 3/1999 | Brunkow et al. . |
| 5,890,911 | 4/1999 | Griswold et al. . |
| 5,896,128 * | 4/1999 | Boyer ................................. 348/14.09 |
| 6,075,571 * | 6/2000 | Kuthyar et al. ...................... 348/584 |
| 6,124,896 * | 9/2000 | Kurashige ............................ 348/584 |
| 6,128,649 * | 10/2000 | Smith et al. ...................... 348/14.03 |

* cited by examiner

SYSTEM AND METHOD FOR LIVE INTERACTIVE DISTANCE LEARNING

FIELD OF THE INVENTION

The invention pertains to the field of distance learning systems, and more particularly, to a live interactive distance learning system, and to an on-line testing, evaluation and reporting system.

BACKGROUND OF INVENTION

Providing instruction and training from a single location to remotely-located students, employees, technicians, etc. over a communication system is well-known in the art, such as disclosed in U.S. Pat. No. 5,850,250 (Konopka et al.); U.S. Pat. No. 5,833,468 (Guy et al.); U.S. Pat. No. 5,303,042 (Lewis et al.); U.S. Pat. No. 5,867,653 (Aras et al.).

Interactive distance learning systems, where teacher and student can interact, are also known in the art such as those disclosed in U.S. Pat. No. 5,537,141 (Harper et al.); U.S. Pat. No. 5,576,844 (Anderson et al.); U.S. Pat. No. 5,421,730 (Lasker, III et al.); 5,263,869 (Ziv-EI); U.S. Pat. No. 5,437,555 (Ziv-EI); U.S. Pat. No. 5,802,284 (Karlton et al.) discloses a computer-based system and method for providing immediate feedback to the user in an interactive television system. U.S. Pat. No. 4,652,240 (Wackym) discloses a computer interactive training system that gives the instructor the ability to dynamically demonstrate every input being displayed on his/her monitor on the student's monitor. See also U.S. Pat. No. 4,715,818 (Shapiro et al.); U.S. Pat. No. 4,785,472 (Shapiro). U.S. Pat. No. 4,622,013 (Cerchio) discloses an interactive software training system for achieving computer-based software training for any user-selected software program. See also U.S. Pat. No. 5,395,243 (Lubin et al.). U.S. Pat. No. 5,820,386 (Sheppard II) discloses an interactive educational apparatus. U.S. Pat. No. 5,325,423 (Lewis) discloses an interactive multimedia communication system that can be utilized with a telephone network, a similar switched network or in combination with a broadcast network (e.g., satellite or cable). U.S. Pat. No. 5,823,788 (Lemelson et al.) discloses an interactive instructional system that includes microprocessor-controlled base station for use by an instructor and/or computer and a plurality of input devices each for use by a student. Among other things, the instructor can continuously tailor the course to the learning speed of the class.

U.S. Pat. No. 5,283,638 (Engberg et al.) discloses a multimedia computing and telecommunications workstation that utilizes a workstation that combines telecommunications circuitry and multimedia circuitry which permits operating these two circuitries for a variety of business and entertainment purposes. See also U.S. Pat. No. 5,283,819 (Glick et al.).

U.S. Pat. No. 5,310,349 (Daniels et al.) discloses a virtual school user interface running on networked personal computers for providing administrative and instructional functions to users in a scholastic environment. U.S. Pat. No. 5,506,954 (Arshi et al.) discloses a personal computer conferencing system. U.S. Pat. No. 5,627,978 (Altom et al.) discloses a graphical user interface, i.e., a multimedia communications application program for setting up and handling a multimedia call in a virtual conference on a desktop computer conferencing system.

U.S. Pat. No. 5,577,208 (Couturier) discloses multimedia intercommunications between computer workstations having an auxiliary unit that is directly connected to the output of the workstation and the display input wherein local and remote image data are combined.

U.S. Pat. No. 5,772,446 (Rosen) discloses a system which includes a note-making facility, a mentor facility and an editor facility.

The use of videoconferencing is known in the art. U.S. Pat. No. 4,360,827 (Braun); U.S. Pat. No. 4,414,621 (Bown et al.); U.S. Pat. No. 4,650,929 (Boerger et al.); U.S. Pat. No. 4,710,917 (Tompkins et al.); U.S. Pat. No. 4,882,743 (Mahmoud); U.S. Pat. No. 5,272,526 (Yoneta et al.) discloses a television conference system; U.S. Pat. No. 5,257,306 (Watanabe); U.S. Pat. No. 5,382,972 (Kannes); U.S. Pat. No. 5,767,897 (Howell); U.S. Pat. No. 5,872,923 (Schwartz et al.) discloses a video conference system wherein multiple parties at different locations can view, and modify, a common image on their computer displays. U.S. Pat. No. 5,491,508 (Friedell et al.) discloses a personal computer video conferencing system. U.S. Pat. No. 5,657,246 (Hogan et al.) discloses a graphical user interface that allows a "windows" type operations to control various aspects of a video conference.

U.S. Pat. No. 5,823,786 (Easterbrook) discloses a system for instructing a pupil whereby one video monitor has a split screen facility to display in comparing relationship instructor and pupil images.

U.S. Pat. No. 5,847,709 (Card et al.) discloses a three-dimensional workspace for interacting with large numbers of document objects.

U.S. Pat. No. 5,176,520 (Hamilton) discloses a computer-assisted instructional delivery system and method, thereby allowing a teacher to share an electronic sheet of paper with one or more students in a classroom. See also U.S. Pat. No. 5,239,373 (Tang et al.). U.S. Pat. No. 5,857,189 (Riddle) discloses a system and method for enabling teleconferencing members to share files during a teleconference.

U.S. Pat. No. 4,609,358 (Sangster) discloses a video training system for simultaneously training a plurality of students but does not include a live instructor. U.S. Pat. No. 5,822,525 (Tafoya et al.) discloses a presentation system for displaying a presentation at multiple computer systems.

U.S. Pat. No. 5,587,928 (Jones et al.) discloses a computer teleconferencing method and apparatus that permits transmission of video image sources including both computer display images and other video images. See also U.S. Pat. No. 5,206,934 (Naef, III).

U.S. Pat. No. 5,059,127 (Lewis et al.) discloses a computerized mastery testing system which provides for the computerized implementation of sequential testing in order to reduce test length without sacrificing mastery classification accuracy. U.S. Pat. No. 5,180,309 (Egnor) discloses an automated answer evaluation and scoring system and method; U.S. Pat. Nos. 5,749,736/5,797,754/5,890,911 (Griswold et al.) disclose a method and system for computerized learning, response and evaluation. U.S. Pat. No. 5,752,836 (Clark et al.) discloses a method for reporting groupings of answers to test questions. U.S. Pat. No. 5,827,070 (Kershaw et al.) discloses a computer based testing system that includes a test development system for producing a computerized test, a test delivery system for delivering the test to the examinee, and a workstation on which the computerized test is delivered to the examinee.

U.S. Pat. No. 5,204,813 (Samph et al.) discloses a computer-controlled testing process and device for administering an examination. U.S. Pat. No. 5,513,994 (Kershaw et al.) discloses a centralized administrative system of administering standardized tests to a plurality of examinees. See also U.S. Pat. No. 5,259,766 (Sack et al.). U.S. Pat. No. 5,321,611 discloses a system for increasing the speed at which test answers are processed. U.S. Pat. Nos. 5,458,493/5,690,497 (Clark et al.) discloses a dynamic on-line scoring method.

U.S. Pat. No. 5,810,605 (Siefert) discloses computerized repositories applied to education.

U.S. Pat. No. 5,879,165 (Brunkow et al.) discloses a method of using a computer for creating and comprehensively analyzing in an integrated manner a test and course of study or job performance, assessing multiple transferrable skills within the context of course competencies at the individual test assessment level.

A company by the name of Edutest.com offers on-line subscription services concerning various school-related assessment services such as testing and drilling on subject matter such as math and English.

However, there remains a need for a system and method that provides interactive instruction to remote student locations whereby the instructor can be virtually positioned on the subject matter being taught (e.g., a software application) in a display screen being watched by the students. There also remains a need for a system and method of testing these students from remote locations, of modifying such testing on the fly, and being able to instantaneously evaluate the test results, correlate them and then instantaneously provide the results to both the students and their employers.

OBJECTS OF THE INVENTION

Accordingly, it is the general object of this invention to provide an invention that overcomes the disadvantages of the prior art.

It is an object of the present invention to provide a system and method for providing educational content and software training to remote locations.

It is still yet a further object of the present invention to provide a system and method for distance training of on-site personnel while minimizing cost and time commitments for both instructors and the students.

It is still yet another object of the present invention to provide a system and method for distance training of on-site personnel by superimposing an image of the instructor in real-time into the computer screen of the students, thereby allowing the instructor to "move around and point" to various items in the students' computer screen.

It is yet another object of the present invention to provide a system and method that utilizes interactive videoconferencing for providing a portion of the educational content of the training.

It is still yet even a further object of the present invention to provide a system and method for distance training services to companies and consumers ranging from other software developers, manufacturers, learning institutions and home users.

It is yet even a further object of the present invention to provide a system and method that permits a test administrator with the ability to create an exam while a class is being given, based on the material that is covered, and students will have access to that exam immediately.

It is still even yet a further object of the present invention to provide a system and method that permits a site test administrator, as well as an employer of students, to check exam results and all relevant data analysis within seconds of exam completion.

It is even yet another object of the present invention to provide a system and method that permits any changes made to an on-line examination to be propagated throughout the test administration system.

It is still yet a further object of the present invention to provide a system and method for on demand delivery of learning reinforcement to the end user through the use of audio, video, animation, text, Web pages and other interactive multimedia.

It is still yet even still a further object of the present invention to provide a system and method that stores and catalogs such learning reinforcement media, also known as "Learning Objects" in a Learning Object database.

It is still yet a further object of the present invention to provide a system and method for the uniform creation, cataloging and delivery of dynamically-generated interactive course material such as workbooks, study guides, exercise manuals, and other relevant material by exploiting ubiquitous content delivery mechanisms such as Web browsers, network services and multimedia playback engines.

SUMMARY OF THE INVENTION

These and other objects of the instant invention are achieved by providing a system for providing live interactive distance learning to at least one remote location (e.g., a classroom). The system comprises: a video recording means for producing a real-time video/audio signal of an instructor, at another location different from the at least one remote location, against a blue background; a video background generation means for providing at least one background signal of a desired background; a video mixer means, coupled to the video recording means and to the video background generation means, for combining the real-time video/audio signal with the at least one background signal to generate a real-time instruction video/audio signal which virtually positions the instructor in front of the desired background; first communication means coupled between the video mixer means and the at least one remote location for transmitting the real-time instruction video/audio signal to the at least one remote location; at least one display positioned at the at least one remote location for displaying the real-time instruction video/audio signal to end users at the at least one remote location; a second video recording means, coupled to the communication means, for producing a real-time video/audio response signal of the students that is transmitted back to the another location; and a second display and a third display positioned at the another location; the second display is coupled to the video mixer means for displaying the real-time instruction video/audio signal to the instructor, and wherein the third display is coupled to the communication means for displaying to the instructor the real-time video/audio response signal of the end users.

These and other objects of the instant invention are also achieved by providing a system for providing on-line testing and evaluation to remotely-located end users. The system comprises: a Web server coupled to the Internet; a test administrator workstation, coupled to the Web server, for permitting a test administrator to create, modify or delete test questions that the test administrator associates with a test and to permit the test administrator to create, modify or delete the test questions at any time that the associated test is available to end users on-line; the test administrator workstation submits the test questions and their associations to the Web server; a test-building scripts engine is coupled to the Web server whereby the test-building scripts engine generates scripting language corresponding to the test questions and assembles the test when requested from the Web server; a database, coupled to the test-building scripts engine, for storing the test questions and for storing the associations of test questions to the test; an end user browser coupled to the Internet for permitting an end user to request the test and to submit his/her test answers for evaluation; and a test-scoring scripts engine coupled between the database and the Web server, whereby the test-scoring scripts engine instantaneously evaluates the test answers to create test evaluation data of the test taken by the end user.

These and other objects of the instant invention are also achieved by providing a a learning reinforcement library that provides for on-demand delivery of learning reinforcement regarding on-line learning/training courses and testing to an end user who is coupled to the Internet. The learning reinforcement library uses audio, video, animation, text and Web pages (and other interactive multimedia). The learning reinforcement library comprises: a learning object library administrator station coupled to a Web server that is coupled to the Internet. The learning object library administrator station creates profiles of keywords, descriptions, course and class relevance, test/question/answer relevance, associated files and graphics to form "learning objects" using audio, video, animation, text, Web pages (and other interactive mulitmedia); a learning objects database for storing said learning objects; a learning object library scripts engine coupled between the learning objects database and the Web server for generating scripting language corresponding to the learning objects and for assembling the learning objects when requested from the Web server; and an end user browser coupled to the Internet for permitting an end user to make requests for the learning objects via the Web server.

These and other objects of the instant invention are also achieved by providing a method for providing live interactive distance learning to at least one remote location, the method comprising the steps of: video-recording an instructor positioned against a blue background, at another location different from the at least one remote location, to generate a real-time video/audio signal; mixing the real-time video/audio signal with a video background signal representative of a desired background to generate a real-time instruction video/audio signal that virtually positions the instructor in front of the desired background; transmitting the real-time instruction video/audio signal to the at least one remote location; displaying the real-time instruction video/audio signal to end users at the at least one remote location and to the instructor at the another location; and video-recording the end users at the at least one remote location to generate a real-time video/audio response signal of the end users that is transmitted back to the another location and displayed to the instructor.

These and other objects of the instant invention are also achieved by providing a method for providing on-line testing to at least one remotely-located end user who is connected to the Internet via an end user browser. The method comprises the steps of: storing test questions along with correct answers to the test questions, substantially instantaneously after the test questions are created, and associating the test questions with a test name in a database; building a test from the stored test questions using a test-building scripts engine that is coupled to a Web server, connected to the Internet, whenever the Web server receives a request from the at least one remotely-located end user to take the test name.

These and other objects of the instant invention are also achieved by providing a method for providing on-line workbooks to at least one remotely-located end user who is connected to the Internet via an end user browser. The method comprises the steps of: storing course material in a database; building a workbook from the stored course material using a workbook-building scripts engine that is coupled to the database and to a Web server, which is connected to the Internet, whenever the Web server receives a request from the at least one remotely-located end user to obtain said workbook.

These and other objects of the instant invention are also achieved by providing a method for providing on-line learning reinforcement regarding on-line learning/training courses and testing to an end user coupled to the Internet via an end user browser using audio, video, animation, text and Web pages. The method comprises the steps of: creating profiles of keywords, descriptions, course and class relevance, test/question/answer relevance, associated files and graphics to form "learning objects"; storing the learning objects in a database; assembling the learning objects, pertinent to a request from the end user browser, from the database using a learning objects library scripts engine for generating the scripting language corresponding to the learning objects; and instantaneously providing the learning objects to the end user browser to achieve learning reinforcement.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 11 is a display screen of the test administrator station Question Builder interface;

FIG. 14 is a display screen of the on-site administrator station interface;

DETAILED DESCRIPTION OF THE PREFERRED EMBODIMENT

The name "Optasia" used throughout this Specification and Figures in this application is the name of the division of the Assignee, namely Corrugated Services Corporation, t/a Amtech, who is also the Assignee of the present invention of this application, that is responsible for implementing the system and method described below.

Figure 1:
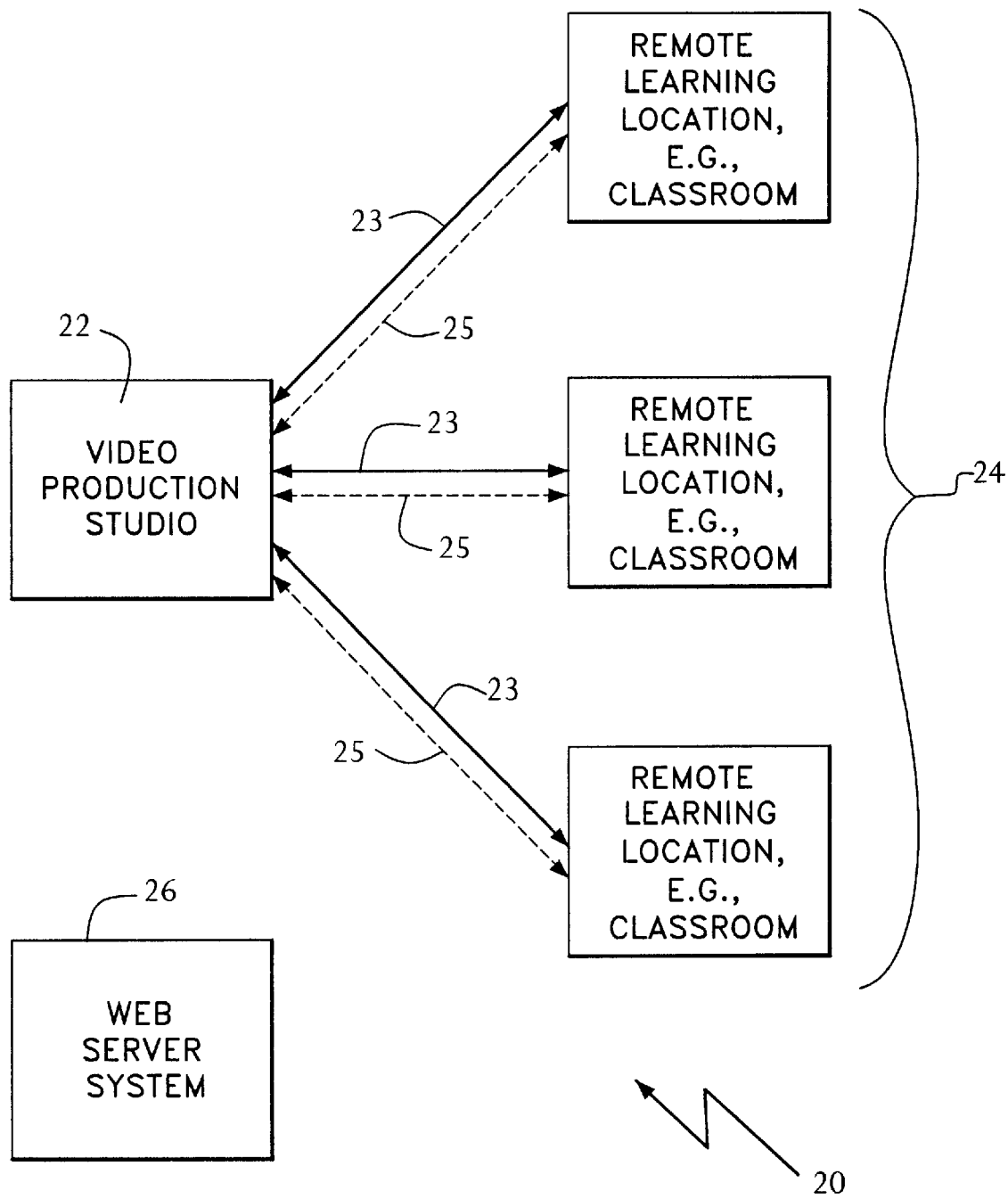
FIG. 1 a block diagram of the Internet-based, interactive distance learning system of the present invention.

Referring now in detail to the various figures of the drawing wherein like reference characters refer to like parts, there is shown at 20 in FIG. 1, a system for providing an interactive, Internet-based, videoconferencing multicast operation which utilizes a professional quality video production studio 22 at a first location with a live instructor giving lectures (or seminars) in real-time to multiple participants (e.g., students, employees, consumers, etc.), at a variety of remote learning locations 24. A Web server system 26, including a Web server 27 (FIG. 2), forms a third portion of the system 20, and will be discussed in detail later. Instruction and response between the studio 22 and each remote location 24 is accomplished via an interactive video/audio communication link 23 and an interactive software application communication link 25, as will be described in detail below.

It should be noted that use of the term "student" throughout this Specification is not limited to the traditional definition of that word. As used in this Specification, the term "student" or "end user" is meant to encompass anyone whose is taking a course, a test, receiving instruction or training, etc., via the system 20. Furthermore, the term "learning" as used in this Specification also encompasses training that can be offered through the system 20.

Figure 2:
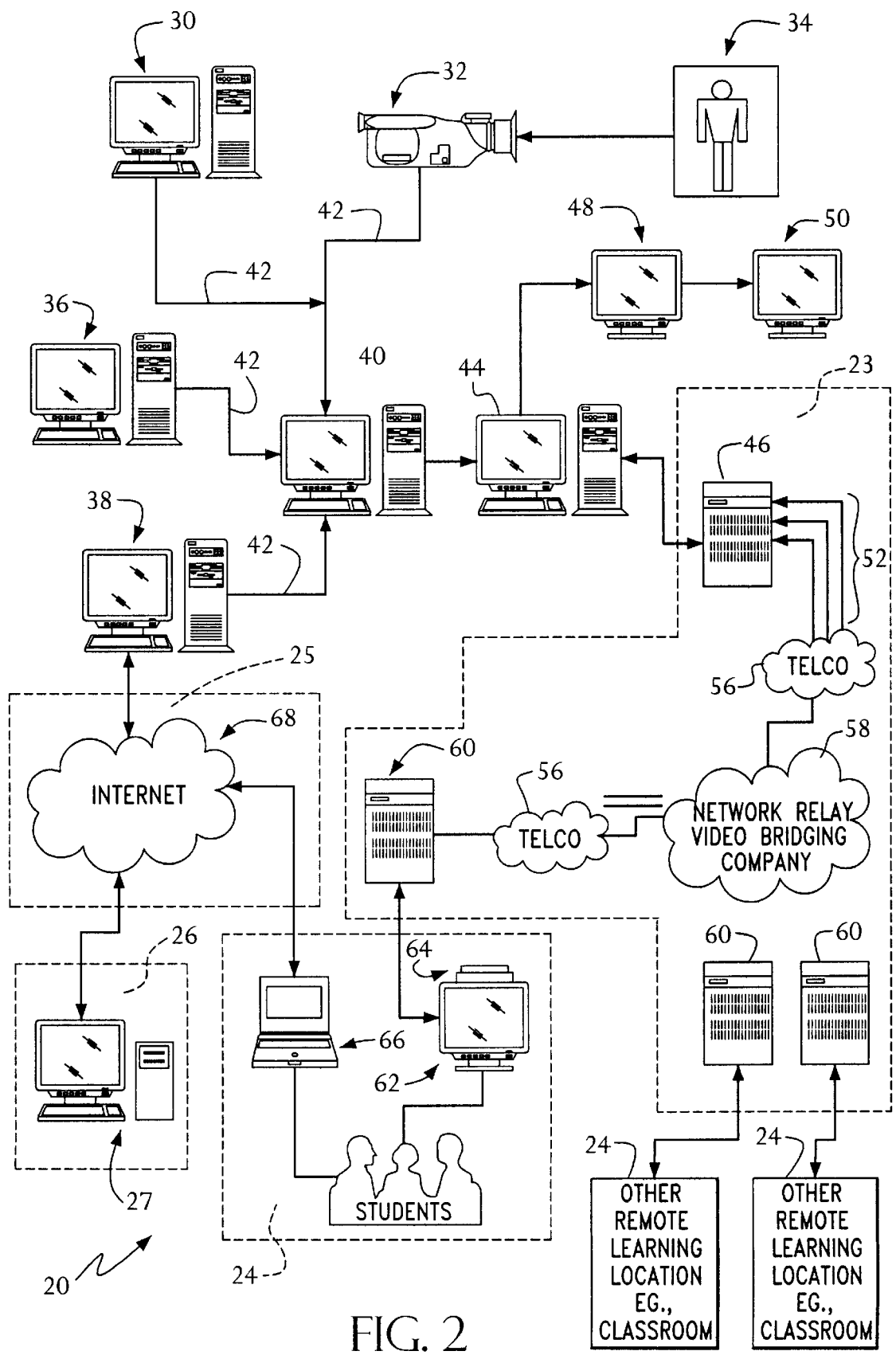
FIG. 2 is a functional diagram of the Internet-based, interactive distance learning system of the present invention.

As shown most clearly in FIG. 2, the video production studio 22 comprises a video background station 30, a studio camera 32, an instructor/actor positioned in a floor-to-ceiling blue screen studio 34, a graphic workstation 36, a software application station 38 and a digital video mixer station 40. Each of the aforementioned stations may comprise any conventional computer workstation using a Pentium II processor or greater. The video background station 30 comprises pre-edited video and the graphic workstation 36 comprises graphical skits, anecdotes, etc. The software application workstation 38 comprises the driving software, i.e., the software application about which the instruction is being given; the studio camera 32 videotapes the instructor/actor. The outputs of the video background station 30, the studio camera 32, the graphic workstation 36, the studio camera 32 and the software application workstation 38 are fed into the digital video mixer station 40 through conventional network connections 42. The digital video mixer (also known as a Chromakey device) station 40 provides for the video editing of all of the other workstation and camera inputs and permits the video producer to place the instructor/actor against any background in real-time.

As used throughout this Specification, the term "video-recording" and/or "video recording means" is meant to encompass a live (i.e., real-time) video signal that is generated for broadcast and for archiving simultaneously. Thus, the system 20 supports both live video broadcasting, as well as broadcasting from pre-recorded matter. Furthermore, the term "videoconferencing" as used throughout this Specification is defined as the device-independent implementation of multicasting live video, point-to-point for the purpose of live video/audio interaction and collaboration between multiple locations. In other words, conventional use of the term "videoconferencing" tends to be limited to a certain set of equipment whereby one point broadcasts to multiple remote locations which receive the video/audio. In contrast, the term "videoconferencing" used in this Specification encompasses every end point (e.g., the video production studio 22 and every remote learning location 24) being able to both broadcast and receive visual/audio signals.

The video production studio 22 further comprises a signal controller 44. The signal controller 44 may comprise any conventional digital video workstation using a Pentium II processor or greater in conjunction with added digital video compression hardware and software. The signal controller 44 basically functions as a gateway, outputting the instruction video/audio signal from the digital video mixer workstation 40 over the video/audio communication link 23 and also receiving the video/audio signal from each of the remote student locations over the video/audio communication link 23. In addition, the studio 22 also comprises an output video display station 48, coupled to the signal controller 44, and a student classrooms display station 50. These two display stations 48 and 50 provide the instructor/actor with the ability to observe exactly what the students are seeing from the digital video mixer 40 (via display station 48) and to observe the students themselves (display station 50).

The communication link 23 is described next. The communication link 23, a shown in FIG. 2, comprises an inverse multiplexer (IMUX) 46, multiple ISDN (Integrated Services Digital Network) lines 52, the telephone company 56, a network relay video bridging company 58, and IMUXs 60 for each of the remote learning locations 24. The IMUX 46 (e.g., any conventional IMUX) takes the video/audio output signal of the signal controller 44 and distributes it over for ultimate dissemination to each of the remote learning locations 24. The ISDN lines are fed to the telephone company 56 and a network relay video bridging company 58. In particular, video/audio signal is delivered to the students on-site via a series of bonded of ISDN digital phone lines. The bridging company 58 is used as an intermediary. The system 20 dials into the bridging company 58 via three bonded ISDN lines and sends one video/audio signal to the bridging company 58. The remote learning locations 24 also dial into the bridging company 58, via their respective IMUXs 60, to receive the video/audio signal. This allows the one signal from the studio 22 to be sent to multiple remote locations 24 without loss of quality or undue financial overhead for additional bandwidth in the studio 22. Students on-site 24 view the instructor/actor in full-screen mode, as discussed below, while the instructor/actor sees all sites 24 on segmented video screens, with four classrooms per video monitor (see discussion of output display 50 below).

It should be understood that the communications network 23 is by way of example only and that any other type of communications network service or combination of network services could be used to suit a particular deployment of the present invention. Examples of such communications networks include, but are not limited to, direct satellite, broadband cable Internet, Digital Subscriber Line (DSL and ADSL), leased T-1 or T-3 digital line, frame relay, local and wide area networking, electrical current IP (Internet Protocol) delivery, cellular modem, infrared networking, Ethernet, virtual private networking, fiber optic, fire wire and other hardware networking environments in conjunction with appropriate communications protocols such as IP, IPX, UDP, and others.

Each remote learning location 24 comprises its respective IMUX 60, an output display (e.g., a television screen) station 62, a classroom camera 64 and a student workstation 66. The IMUX 60 receives the incoming video/audio signal from the communications network 23 and transmits it to the output display station 62 so that the students can see and listen to the instructor. In addition, the classroom camera 64 records the students and conveys that video/audio signal to the IMUX 64, to the communication network 23 and ultimately to the student classrooms display station 50 in the studio 22 over the interactive video/audio communication link 23. Thus, such videoconference multicasting allows the students to interact with the teacher and other installations during the course of lecture.

Figure 3:
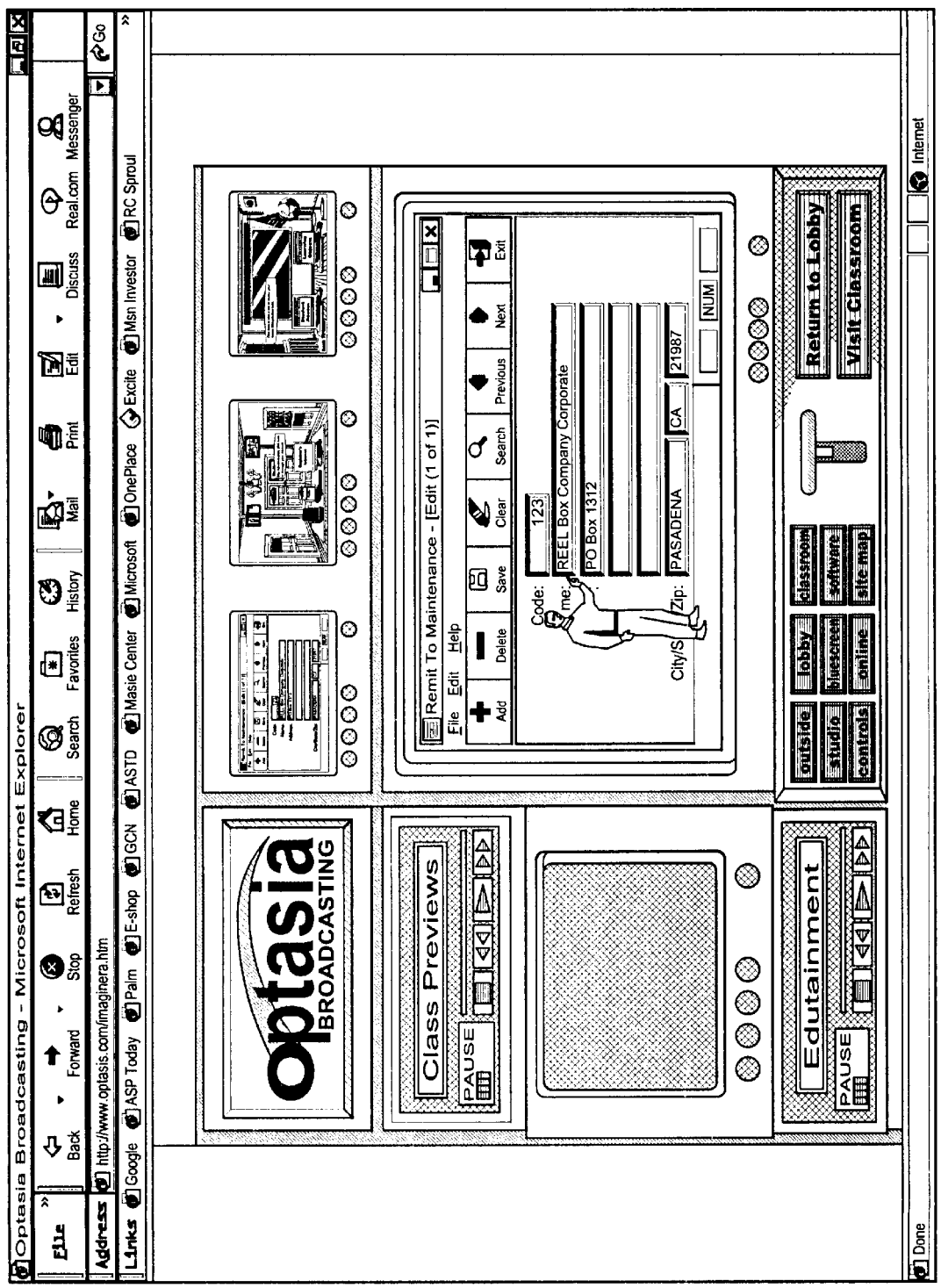
FIG. 3 is a display screen of the present invention showing the instructor superimposed on the television screen at the student workstation.

Because the studio 22 consists of a floor to ceiling blue screen, the video producer can "place" the instructor/actor on any variety of backgrounds. For example, if the seminar is being taught regarding the Imaginera software application (owned by the Amtech Corporation, the same Assignee of the present invention), that software application is running at the software application station 38 and, as such, the screen display for that software application can form the background for the instructor/actor. See FIG. 3. The instructor then uses the monitors 48 and 50 in the studio 22, which allows the instructor/actor to see himself/herself as the students see them, superimposed on the Imaginera software screen; this allows the instructor/actor to "move" around the display screen and point on the screen to areas which are being discussed. The background image from the software application workstation 38 is supplied to a scan converter (not shown, but included in the software application workstation 38) to generate an NTSC (National Television System Committee) video signal which allows the instructor to pan and zoom around the software screen (although not shown, the instructor is linked to the scan converter with a remote control for activating the pan and zoom capability). This permits the student to take a focused look on the topic in discussion. The scan converter may also be programmed prior to a seminar with preset coordinates to allow immediate or gradual panning and zooming around the background image. Thus, an example of the video/audio signal delivered to the students' workstation output display screen 62 is shown in FIG. 3, with the instructor/actor superimposed on the background of the Imaginera software display screen.

It should be understood that use of the Imaginera software application is by example only and that any other software application, or other digital subject matter (e.g., white collaboration board, content-related slideshows, etc.) could be used at the software application workstation 38. It should also be understood that where the software application forms the background image, the video background workstation 30 output is not required since the software application workstation 38 provides the requisite signal to the digital video mixer 40. Thus, where the background image is supplied by the software application workstation 38, the workstation 38 functions as the video background workstation 30.

As mentioned previously, there is also an interactive software application communication link 25. This link 25 basically links the software application workstation 38 in the studio 22 with each student workstation 66 at each remote student location 24 via the Internet 68. To "share" the software application between the workstation 38 and each of the student workstations 66 over the Internet 68, one exemplary interface that permits such sharing is Microsoft NetMeeting product. In particular, Microsoft NetMeeting, is used to allow students to dial in to the studio 22 via the Internet 68 and share the software application (e.g., the Imaginera software application) that is running in the studio 22 at the software application workstation 38. Thus, at any one time, with a plurality of student workstations 66 coupled through the Internet 68 over their respective software application communication link 25, one of the students' workstations is designated by the production manager (not shown, located at the studio 22) to drive the studio software application workstation 38. In particular, at the student workstation 66 so designated, the student uses his/her keyboard and mouse to drive the studio software application workstation 38. As such, when the instructor/actor points to a button or drop down menu to explain its function, all of the students see this on their output display screen 62 and also see the mouse movements, of the designated student workstation, on the software screen that appears in their respective output display screen 62. The effect is similar to having the instructor/actor "walking around" the students' computer screen instructing them on how to use the software.

It should also be understood that, if not for bandwidth limitations, it is desirable to deliver all content, video and otherwise, through one communication system, e.g., Broadband Cable Internet, or point-to-point satellite communication, utilizing streaming IP-based (Internet Protocol) video broadcast. Thus, when the system 20 is configured through one such communication system utilizing streaming IP-based video broadcast (i.e., any broadband communication network which includes high-speed Internet communication) the communication link 23 would become the communication link 25; as a result, the instruction video/audio signal from the digital video mixer 44, as well as the video/audio signal from each of the remote learning locations, would be carried over the communication link 25. In particular, with the single communication system being the communication link 25, the instructor/actor's image is superimposed on the students' workstation 66 computer screen itself, thereby making the output display screen 62 redundant. One manner of implementing such a display screen configuration would be to be use Microsoft Agent, or something equivalent, to superimpose an image of the instructor/actor inside the workstation 66 display screen itself.

Seminars are prepared by the teaching staff for the particular subject being taught to be used by the instructor/actor. In particular, the teaching staff includes writers and actors who liven up the instruction and reinforce knowledge through role-plays and vignettes performed during the seminars. Each seminar is comprised of scripted content, modeled after pay-per-view and cable programming, falling under the newly-coined concept of "Edutainment." Also, as mentioned earlier, the seminar is supplemented with pre-taped video segments from the video background station 36. Workbooks are physically distributed to the students at the remote locations 24 and can be obtained through the Web server system 26, as will be discussed later. Pop-quizzes and final examinations are also provided to the students, as will also be discussed later.

It is important to note that each training site 24 has multiple students in varying numbers. The method of broadcast of the system 20 is also scalable to accommodate any number of virtual classrooms at one time.

Figure 4:
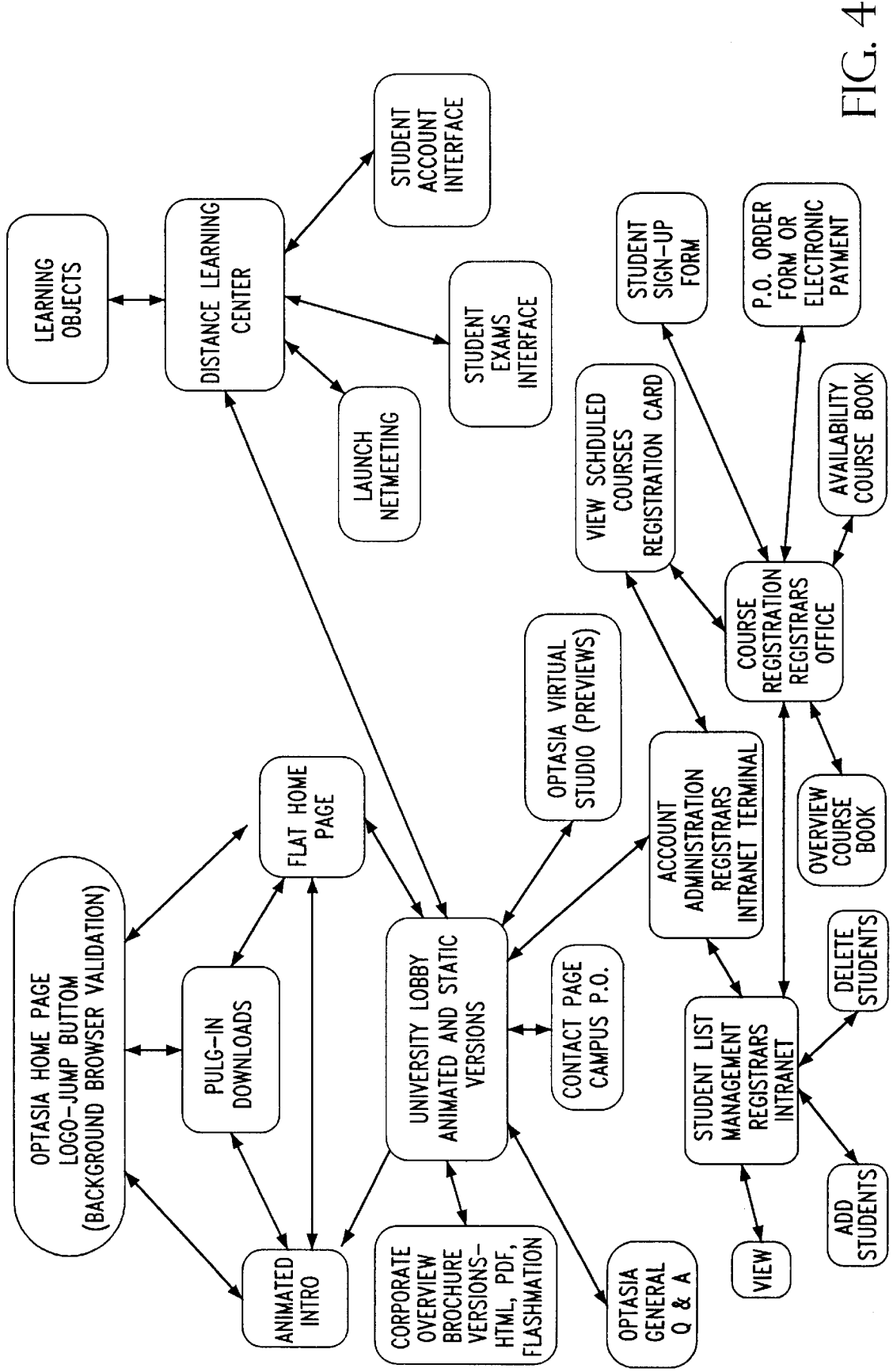
FIG. 4 is a flowchart for the Web site server subsystem.

The Web server system 26 (FIG. 4) comprises, among other things, a Web site interface, an examination building/delivery/score tracking system 100 (FIG. 7), a client level account management system 200 (FIG. 9A), a student level account management system 300 (FIG. 9B), and a workbook building system 400 (FIG. 15), each of which will be discussed below.

The Web site interface (WWW.OPTASIA.COM) has been built as a virtual university. An animated introduction (not shown) explains the concept of the virtual, 3-D, navigable environment which includes the outside of the building, a lobby, a virtual broadcast studio, and various classrooms.

Figure 5:
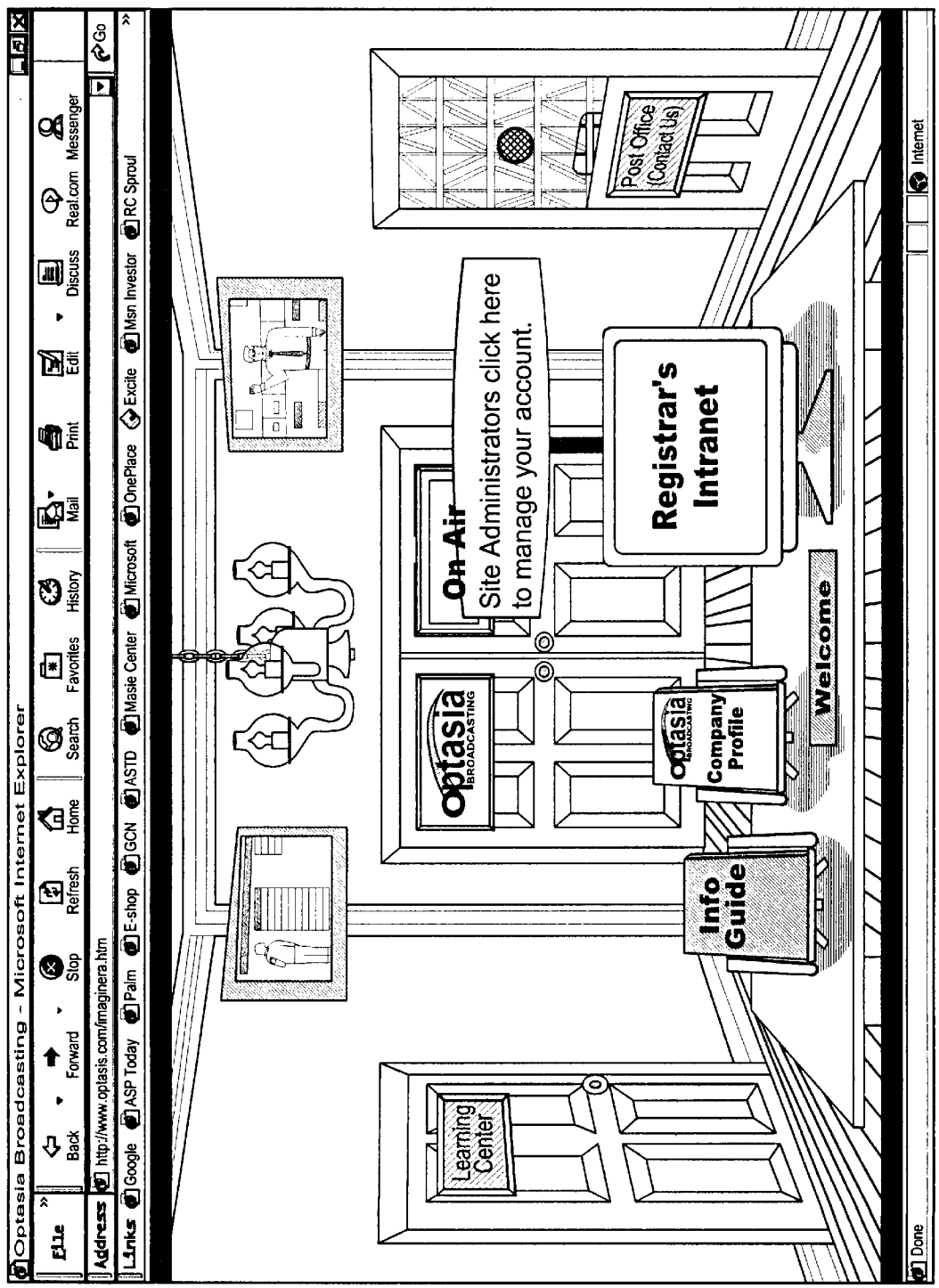
FIG. 5 is a display screen for a virtual university offered at the Web site of the present invention.
Figure 14:
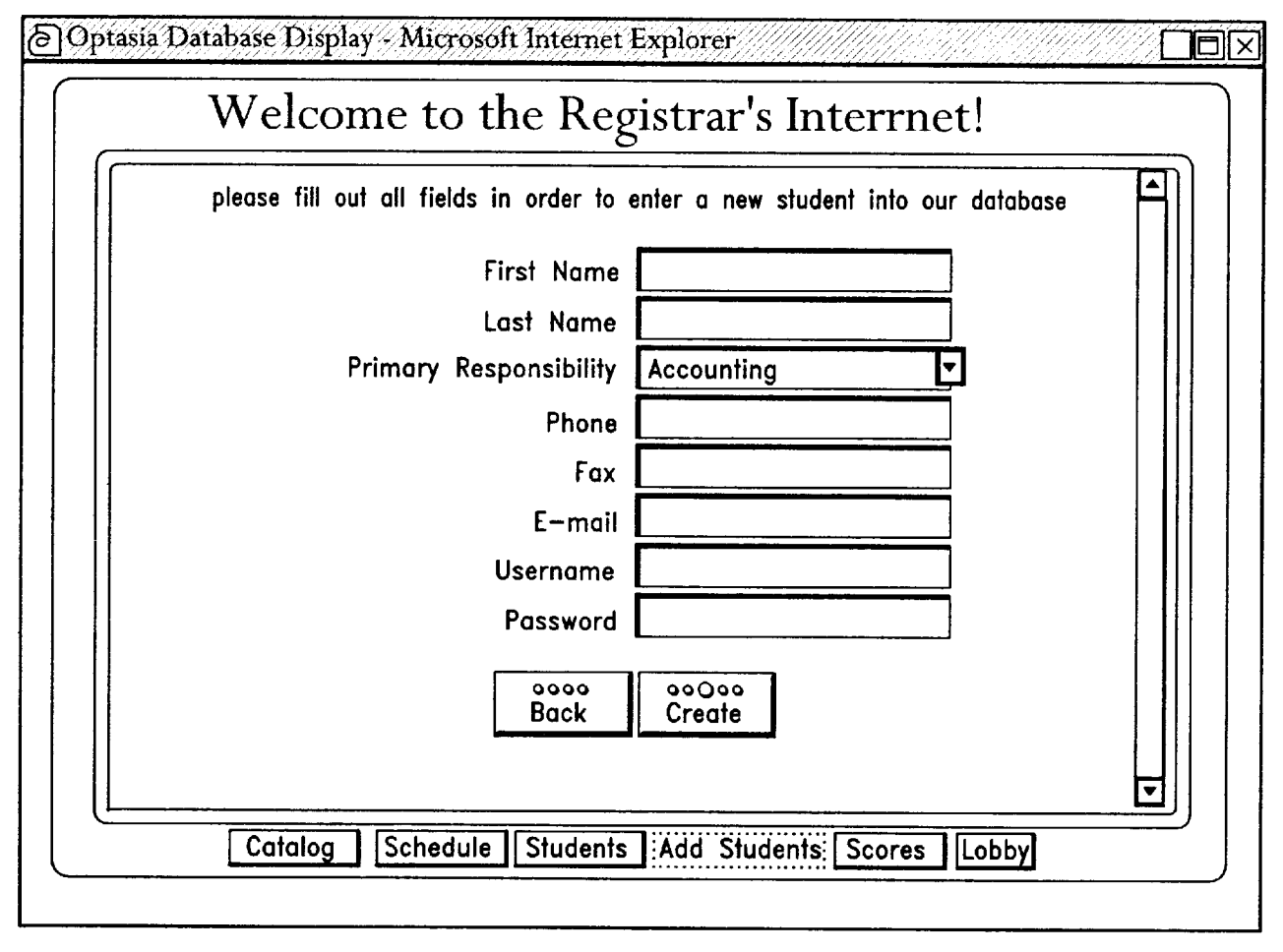

As shown in FIG. 5, the University Lobby is designed as a 3-D interface with everything in the room being a clickable navigational icon. In the foreground is the "welcome desk". On the desk are a "Q&A" booklet, a company brochure, and a computer terminal. The booklet and brochure are linked to separate static Web pages, which provide information about Optasia, how to register for classes, how to use the site, etc. The computer terminal, when clicked, brings up another stand-alone page, which is a "zoom-in" to the terminal. On the virtual computer screen are buttons which allow an on-site administrator to query or modify information (FIG. 14) pertaining to their account (and discussed below).

The University Lobby also contains doorways to other rooms in the virtual university. A click on the "Post Office" window opens a contact form and allows visitors to post their contact information via e-mail to Optasia staff. A click on the studio doorway brings the visitor into the virtual production studio where they may watch streaming videos (click and play without download waits; such technology is provided by Progressive Networks RealVideo, or other equivalent technology) of class previews, help files and more. Visitors are also shown how the ChromaKey process (i.e., the digital video mixer workstation 40) works by clicking on controls presented on the interface.

Figure 6:
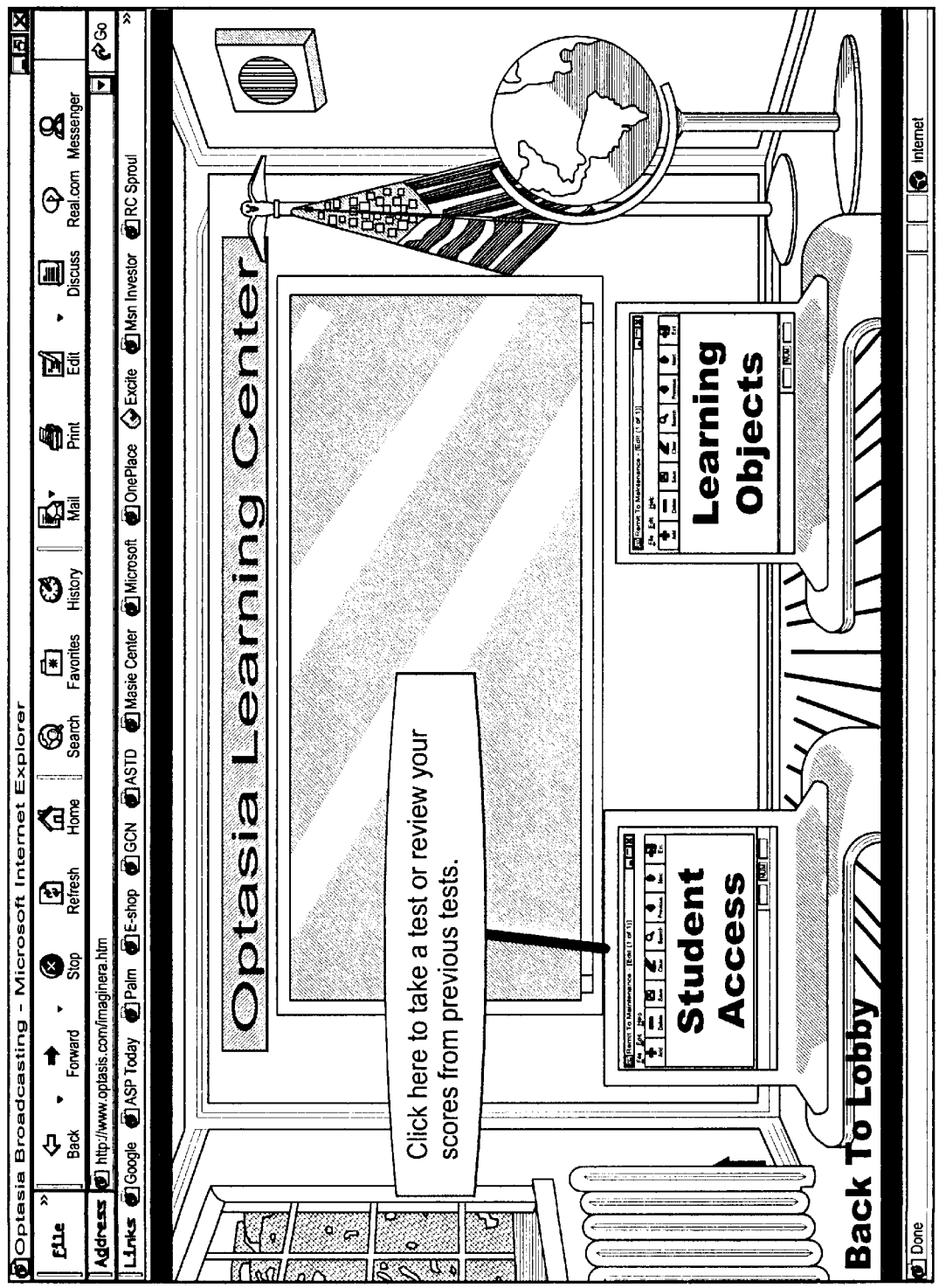
FIG. 6 is a display screen of the Learning Center offered at the Web site of the present invention.

Another door from the University Lobby leads to the Learning Center (FIG. 6). This is where students go to interact with the Web site. Students are able to take their exams, download class workbooks, archived video files, and other learning objects (including screen-video captures with voice-over narration explaining specific features of the software application, e.g., Imaginera software.)

The Learning Center also provides the link to launch Internet-based collaboration software (such as Microsoft NetMeeting) on the student computer workstation 66 and links it via the Internet 68 directly to the software application workstation 38 for application-sharing during lectures, as discussed previously.

Figure 7:
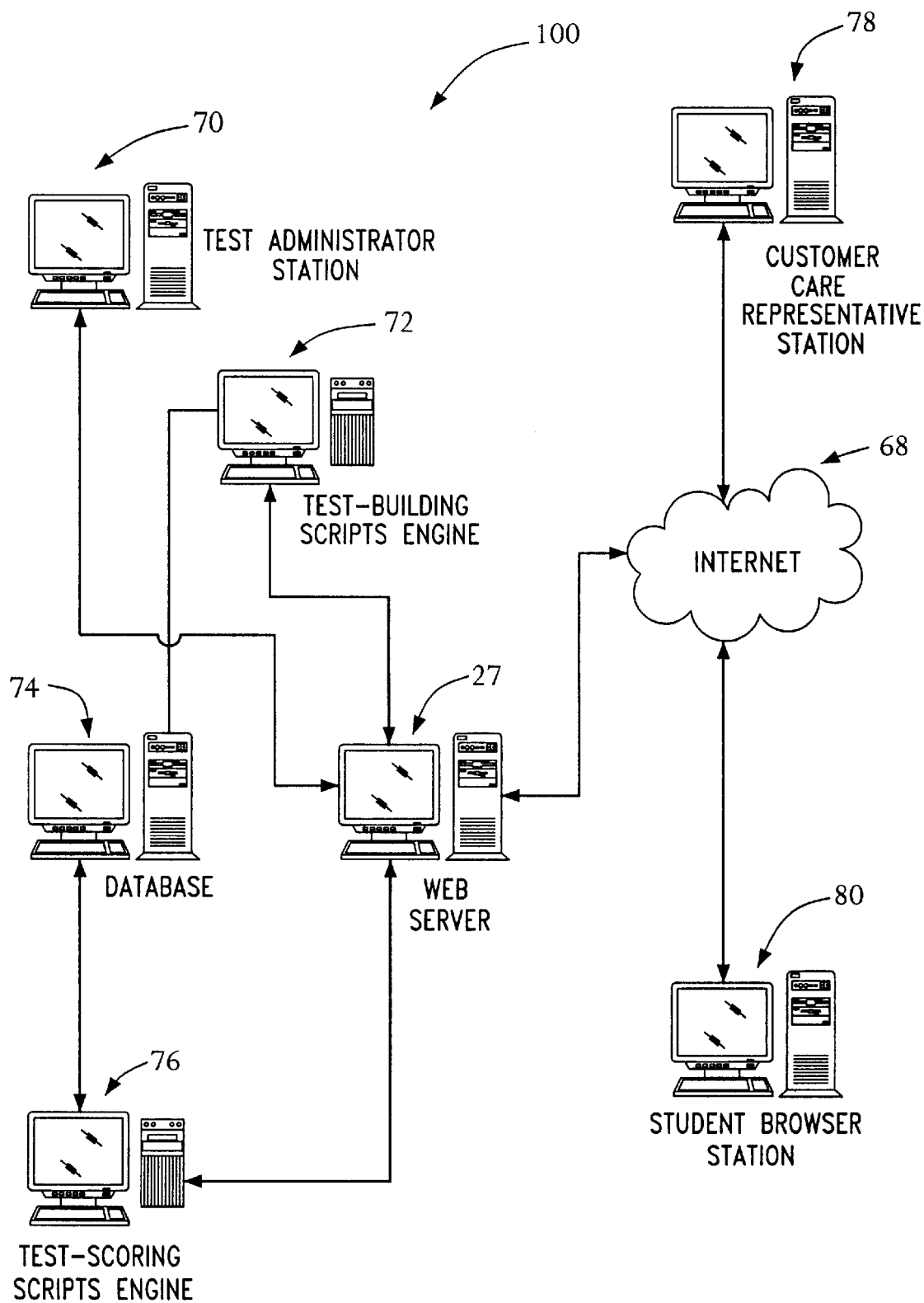
FIG. 7 is a functional diagram of the examination building/delivery/score tracking system of the present invention.

The examination building/delivery/score tracking system 100 is shown in FIG. 7. The examination building/delivery/score tracking system 100 comprises the Web server 27, a test administrator station 70, a test-building scripts engine 72, a database 74 and a test-scoring scripts engine 76. In addition, a customer care representative station 78 and a student browser station 80 (which could also be the student workstation 66) are coupled to the Web server 27 via the Internet 68. All of these stations may comprise any conventional Internet-capable computer using a Pentinum II processor or greater.

As will be discussed in detail later, it should be understood that the examination building/delivery/score tracking system 100 does not store an examination per se. Rather, an examination is "assembled" or "built" from pre-existing questions created originally by the test administrator, and/or the customer care representative, at the moment a student requests to take an exam. The database 74 maintains a correlation between the name of a test and the particular question numbers for that test. This gives the test-building scripts engine 72, which actually builds the exam for the requesting student, the ability to randomize the order of the questions when building the exam. Thus, each student is tested with the same questions but in a different order, thereby minimizing the ability to simply memorize examination answers from a student who may have taken the examination (hereinafter also known as "exam" or "test") previously. In particular, when a student requests to take a particular exam by submitting the name of the test through his student browser station 80, the Web server 27 relays this request to the test-building scripts engine 72, which comprises a scripting language means (e.g., Microsoft Active Server Pages script) for generating the scripting language necessary in gathering the questions to build the exams. In order to generate the exam for the student, the test-building scripts engine 72 then requests all of the pertinent questions from the database 74 correlation. The test-building scripts engine 72 then builds the exam using the random question order and relays the exam to the Web server 27 which then transmits the exam to the requesting student browser 80.

In the present embodiment, the database 74 comprises a questions table, an examination table, a students table and a scores table. The examination table forms the correlation described above which identifies all of the particular question IDs (identification numbers), listed in the question table, that are part of a particular examination ID. It should be understood that it is within the scope of the present invention to include separate databases for each of these categories also. Therefore, a separate database may exist for the questions, for the examination, for the students and the scores categories. Thus, any subsequent reference in this Specification or in the Figures to a questions table or database, an examination) table or database, a students table or database and a scores table or database is meant to include any type of repository for such particular information whether these are centralized, as in the present invention database 74, or distributed.

Figure 11:
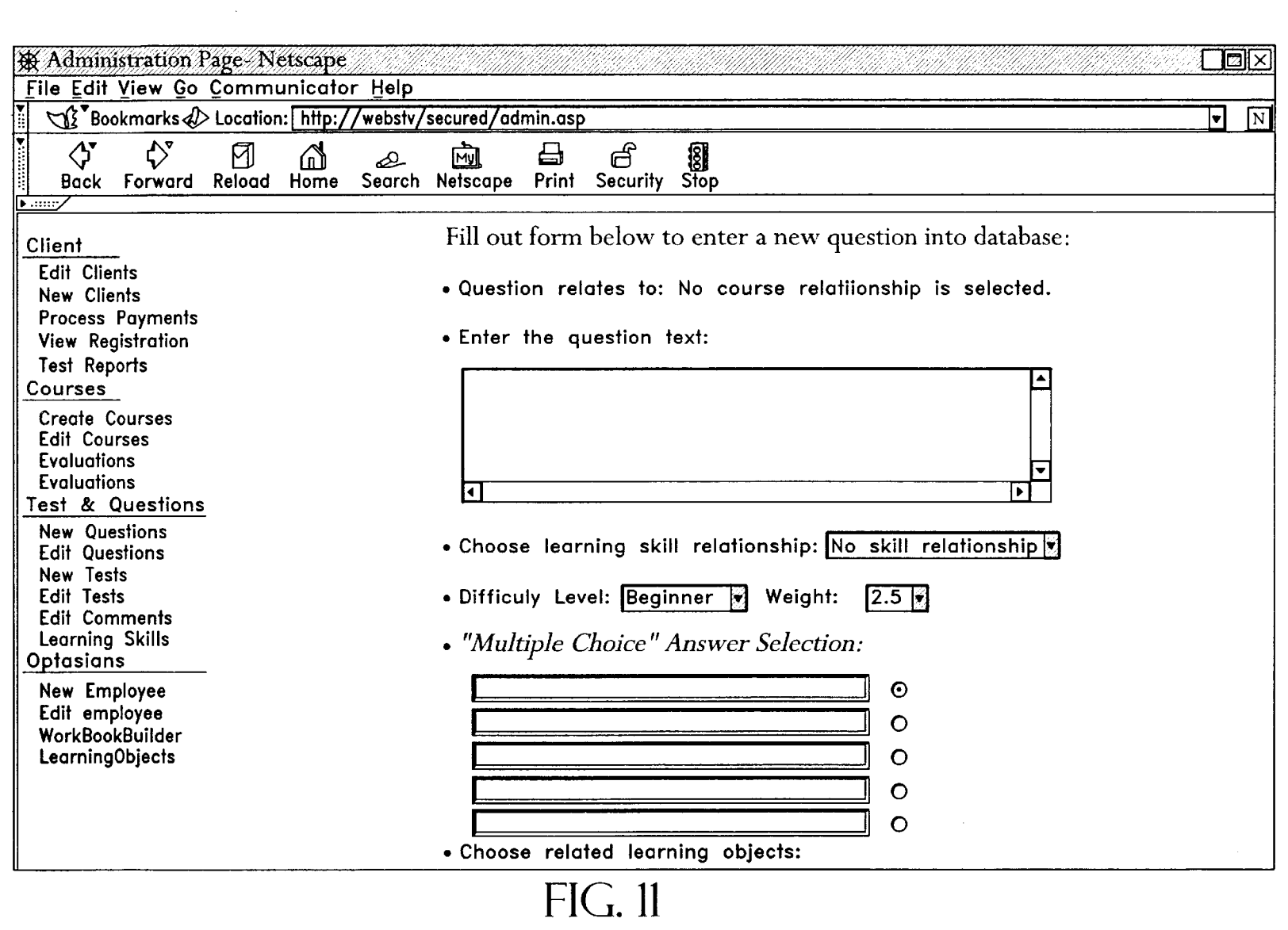

As discussed above, the database 74 and the test-building scripts engine 72 allow the test administrator to originally create, add modify and/or delete questions to the questions table in the database 74 through a password protected Web page. A Question Builder page (FIG. 11) is presented and comprises a form which prompts the test administrator to type a question into a specified field, then choose whether the answer is true/false, multiple choice or fill-in-the-blank. The test administrator then is prompted to type in the answers, which appear on the exam and to designate which answer(s) is correct.

As also mentioned above, a customer care representative (i.e., any authorized Assignee representative, e.g., a field analyst of the Assignee), can also add, modify or delete questions to the questions table in the database 74 via the customer care representative station 78 through the Question Builder page. In essence, the customer care representative acts like an auxiliary test administrator and has the same capabilities as the test administrator in creating questions and exams, as discussed in detail next.

Figure 8A:
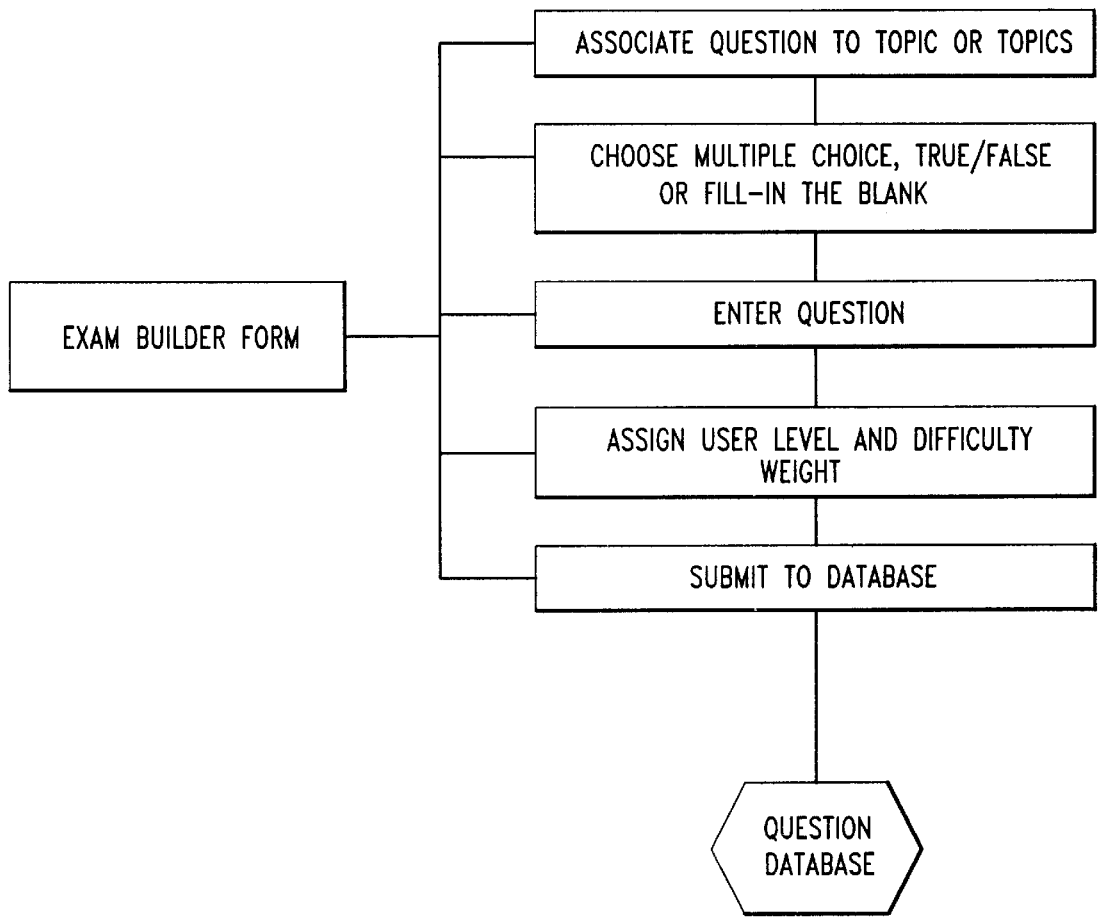
FIG. 8A depicts the flowchart for the Question Builder Form and Database Calls of the examination building/delivery/score tracking system of the present invention.

During creation of the questions, or during the process of adding questions, and before submission to the question table in the database 74, each question is assigned a relative weight for scoring and a "user-level" for creating varying degrees of difficulty in each exam. FIG. 8A depicts the flowchart for the Question Builder Form and Database Calls for creating and submitting the questions. Questions are also designed to ascertain the user level of the student, whether beginner, intermediate, or advanced, based on how they answer questions with more than one correct answer. A question may be posed which has obvious answers and not-so-obvious answers. The advanced user will select all answers while the beginner may only pick the most obvious.

Upon submission, the question, answers, user-level designation, and weight are entered into the database 74. As questions are input, the overall question table in the database 74 grows.

Figure 8B:
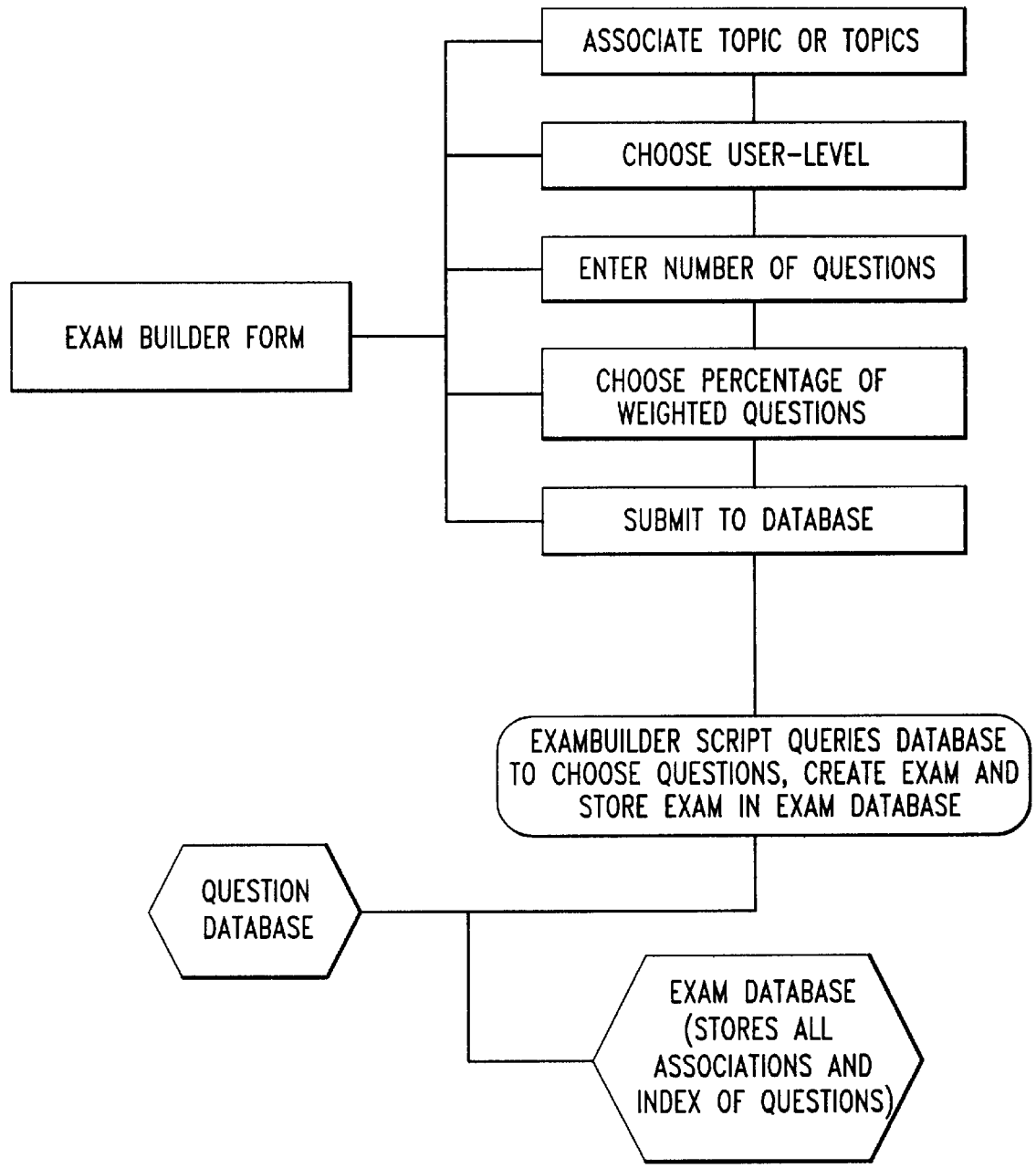
FIG. 8B depicts the flowchart for the Exam Builder Form and Database Calls of the examination building/delivery/score tracking system of the present invention.

In particular, to create an exam, the test administrator (and/or the authorized Assignee representative) uses an Exam Builder Form. FIG. 8B depicts the flowchart for the Exam Builder Form and Database Calls for creating an exam or test. In particular, the test administrator initiates a query to the Web server 27 and specifies the parameters of course title, difficulty level, weight assignment, number of questions, and whether the test is "Active on-demand" or "Inactive" and to be archived for later use. The Web server 27 relays this request to the test-building scripts engine 72. The test-building scripts engine 72 then requests all of the pertinent questions, by question ID, from the database 74 correlation that correspond to the test administrator's request. The database 74 returns a list of all possible questions associated with that topic in the specified order, with corresponding checkboxes to the test-building scripts engine 72 which then assembles all of this information and routes it to the test administrator station 70. The test administrator chooses which questions to place on the exam (or, the test administrator may choose an automated, criteria-based selection process facilitated by the test-building scripts engine 72), and hits a submit button (not shown). This submission is received by the Web server 27 which routes the test administrator's question selection and order to the test-building scripts engine 72 for generating a particular exam. The test-building scripts engine 72 then assigns an exam ID that is stored in the examination table of the database 74 which correlates all of the selected question IDs with the particular exam ID.

Figure 12:
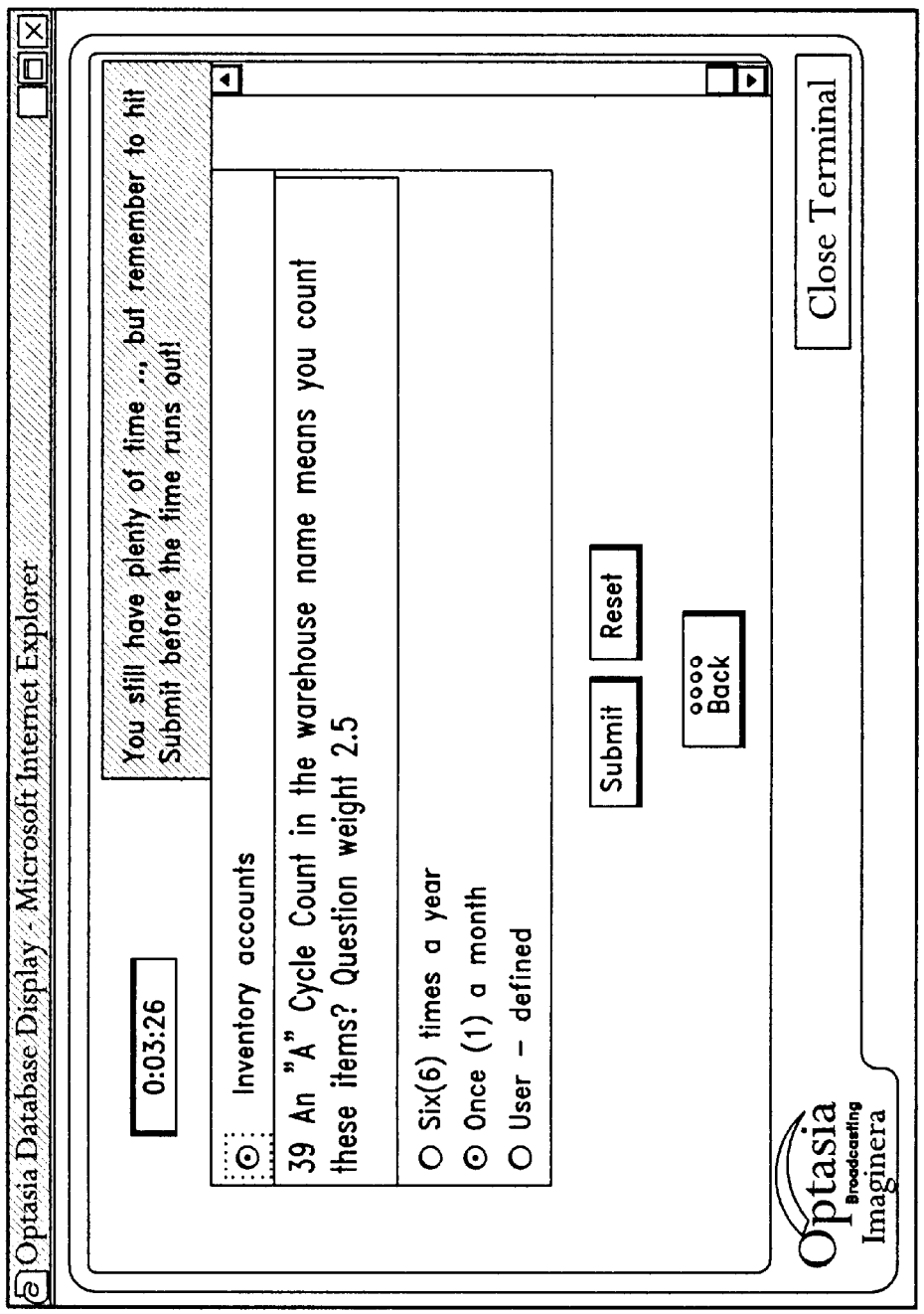
FIG. 12 is a display screen of the student testing interface.

When a student takes the exam and hits the submit button (FIG. 12), his/her answers are sent back to Optasia's Web server 27 and are routed to the test-scoring scripts engine 76 which substantially instantaneously "grades" the submitted exam and then stores all of the relevant evaluation data (student score, every question ID, the exam ID, etc.) in the database 74. In particular, the student's answers are compared against an exam key (not shown, but obtained by the test-scoring scripts engine 76 from the database 74) and a grade is immediately sent back to the student, and dynamically entered into the database 74.

One of the key features of the examination building/delivery/score tracking system 100 is that it operates via the Web server 27 through one central database 74 (or distributed databases discussed previously). As a result, every submission by student, client, or administrator is propagated throughout the Web server 27 and cross-referenced in real-time. For example, the test administrator can literally create an exam while a class is being given, based on the material that is covered, and students will have access to that exam immediately. Also, another example is that all scoring is submitted to the database 74 as well, and as a result, a site administrator, or even the client administrator, may check exam results and all relevant data analysis within seconds of exam completion. In addition, the Test Scoring Scripts engine 76 sends a course completion certificate automatically to the student.

Instantaneous Reporting of Results

As stated above one of the important features of the examination building/delivery/score tracking system 100 is the cross-referencing of all of the test evaluation data in real-time. To provide this information to the client and/or student(s), two on-line reporting systems are provided: a client level account management system 200 (FIG. 9A) and a student level account management system 300 (FIG. 9B). Typically, the client is the purchaser of the training program, responsible for payment and supervision of end-users who are receiving the training, such as employees of a company, students of a class, parents of a student, and so on. As a result, the client level account management system 200 provides all of the pertinent test evaluation data for every student instantaneously to the client through the system 200. On the other hand, the student level account management system 300 provides each student with related test, score, status, etc. data which applies only to him/her on an instantaneous basis also.

The term "supervising entity" as used in throughout this Specification is meant to broadly cover the above term "client" as defined in the preceding paragraph.

The client level account management system 200 (FIG. 9A) comprises a client administrator station 90 for providing the client with remote access to the client account level management system 200. In addition, the system 200 further comprises a client reporting script engine 88 that is coupled between a client account database 86 and the Web server 27. The client account database 86 receives all of the pertinent test-related/evaluation data from the test-scoring scripts engine 76. Through this system 200, a client administrator can request information related to his/her students. The client reporting scripts engine 88 interfaces with the database 74 upon request to capture results and perform calculations which shows a client that its overall (result of all students and all test) percentile ranking relative to other clients on a regional, national and global scale, as well as allow them to view percentile ranking by department or division, by course, by class, by student and also retrieves student exams including questions and corresponding answers with connotation of correct or incorrect.

Figure 10A:
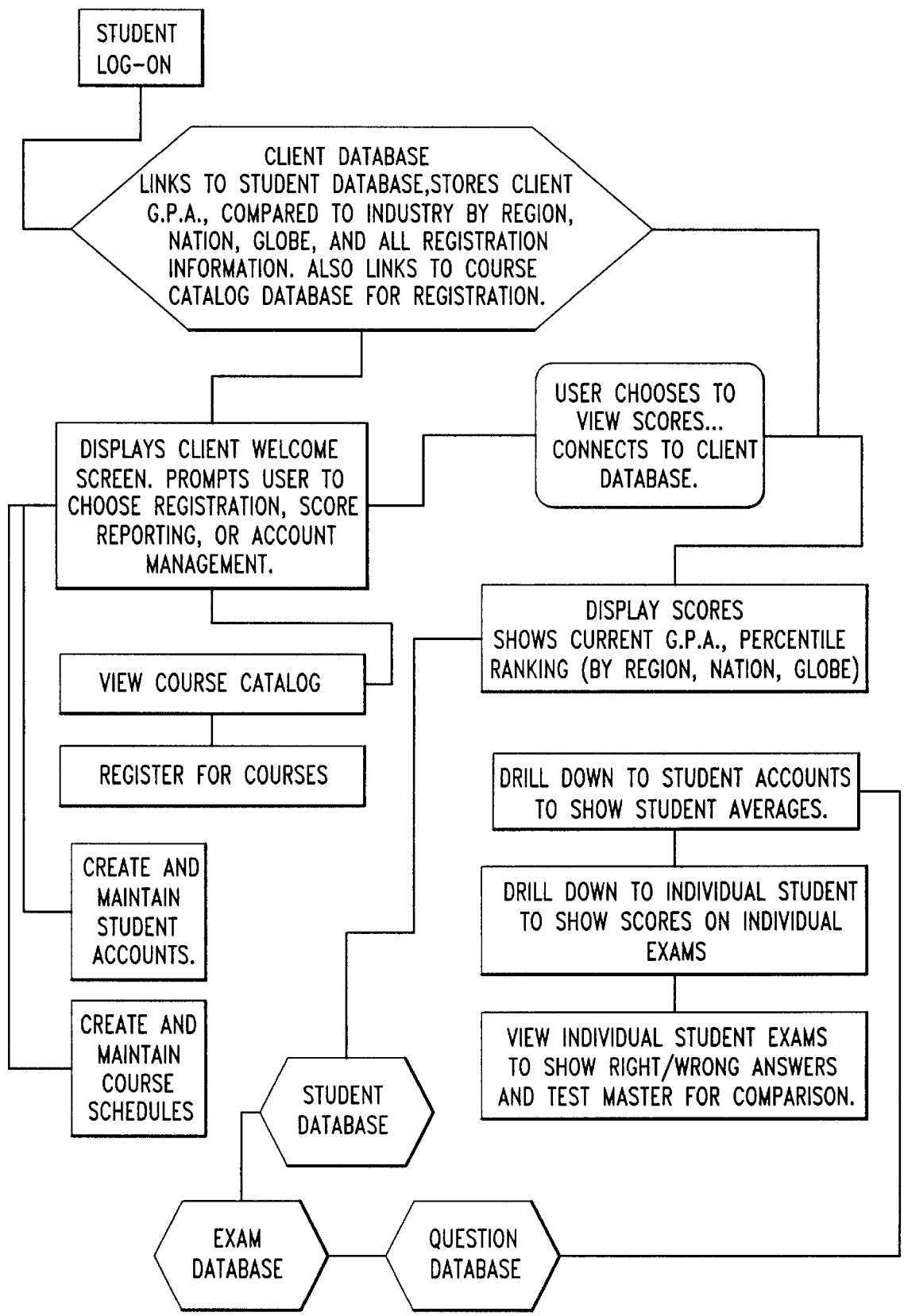
FIG. 10A depicts a flowchart of the client level account management system.

Information provided is accurate within milliseconds of the last exam submitted by a student, as all information is coming from the cross-referenced database structure. Therefore, such information can be provided to the client administrator workstation 90 via e-mail over the Internet 68 instantaneously from the client account database 86. Furthermore, for quality control purposes, the system 200 includes an Optasia quality control station 82 that is coupled to an internal reporting script engine 84, which, in turn, is coupled to the client account database 86. The Optasia quality control station 82, through the internal-reporting scripts engine 84, can track student performance and other test-related data to oversee and maintain high quality testing, evaluation and reporting performance. FIG. 10A depicts the flowchart for operation of the client account level management system 200.

The student level account management system 300 (FIG. 9B) comprises the Optasia quality control station 82 and the internal reporting script engine 84 which is coupled to the Web server 27. A student account database 92 is coupled to the internal reporting script engine 84. The student account database 92 also receives all of the pertinent test-related/evaluation data from the test-scoring scripts engine 76. The student account database 92 is coupled to a student management script engine 94 which is then coupled to the Web server 27. A student browser station 96 (or even the student workstation 66 of FIG. 2) is coupled to the Internet 68, thereby providing the student with remote access to the student level account management system 300. FIG. 10B depicts the flowchart for operation of the student level account management system 300.

All of the stations/databases mentioned above may be implemented with a Pentium II processor or greater. It should be also understood that although the internal reporting script engine 84 is shown as being a common element of both the client level account management system 200 (FIG. 9A) and the student level account management system 300 (FIG. 9B), such sharing is not necessary. It is within the broadest scope of this invention to also include a dedicated internal reporting script engine for each one of account management systems and is not limited to a shared one.

Figure 9A:
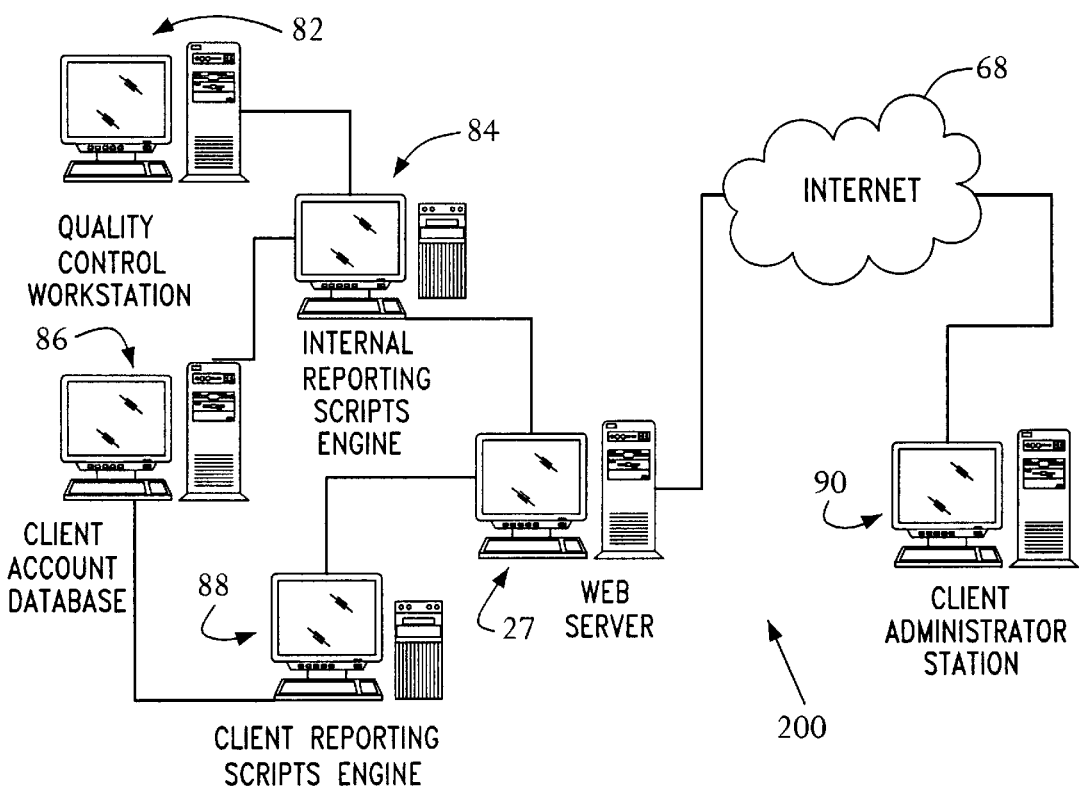
FIG. 9A depicts a functional diagram of the client level account management system.
Figure 9B:
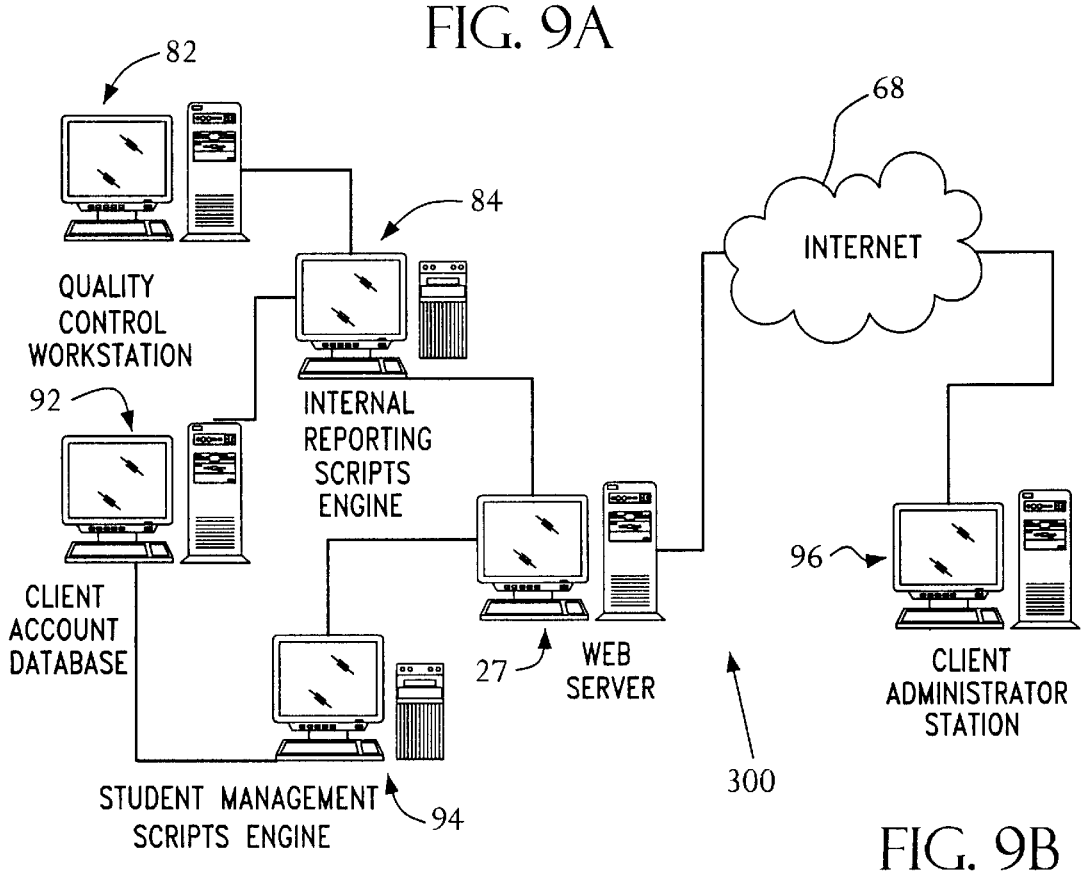
FIG. 9B depicts a functional diagram of the student level account management system.
Figure 10B:
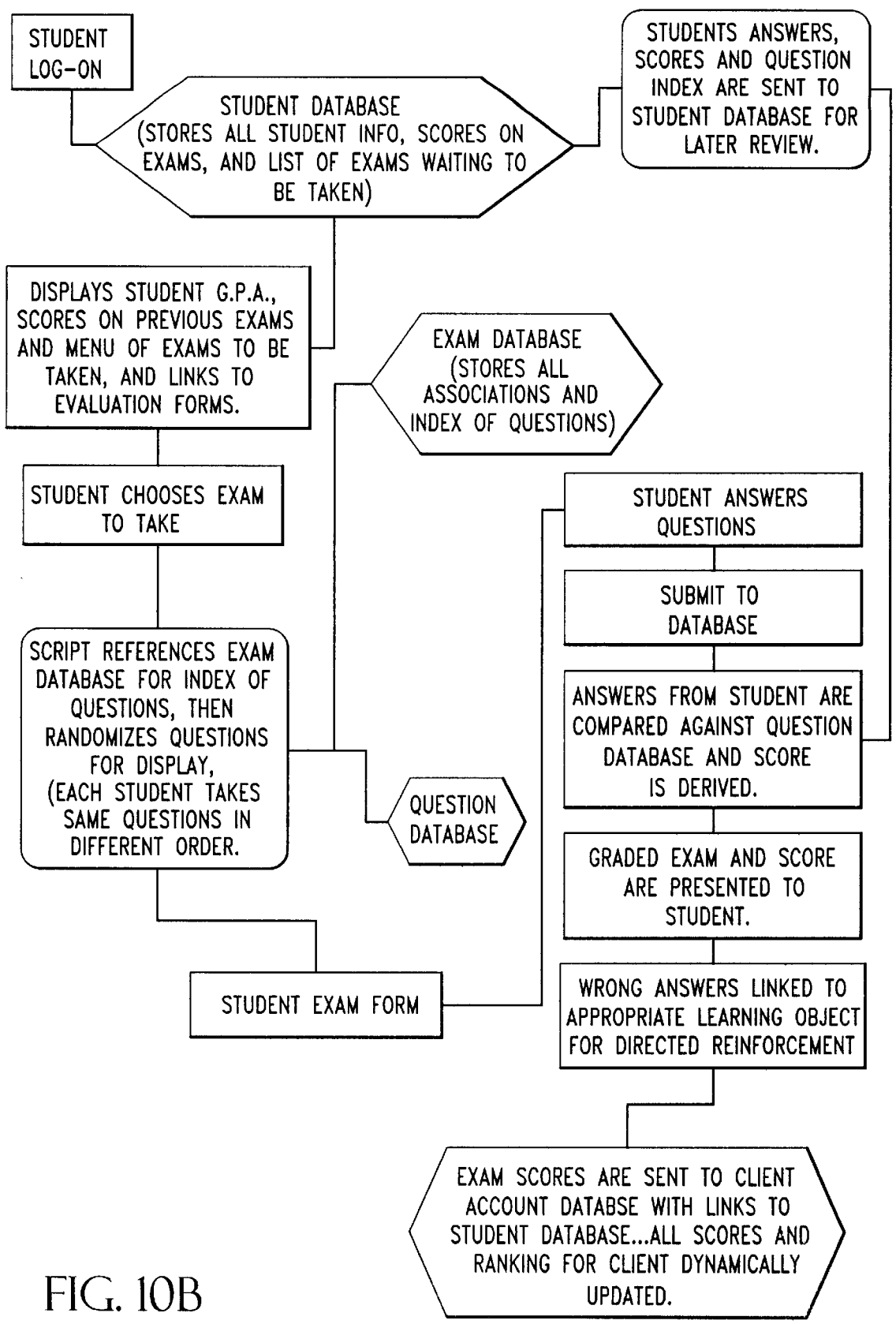
FIG. 10B depicts a flowchart of the student level account management system.

As shown in FIGS. 9A and 9B, the client account database 86 and the student account database 92 are accessible by the Optasia administrator station 82. Such administrator-access is referred to as "back-end functionality." In particular, Optasia Web site is directly linked to a fully relational, ODBC-compliant ("open database connectivity", i.e., a database standard meaning that the file that is generated can be used by any other conventional database) database of immense proportions. "Active Server Pages" (server side scripts) are used to connect the interface of the Optasia Website to a back-end database (not shown) to perform queries, post updates or modifications, and to perform automated or manual analysis of account info and test scoring.

The client administrator station 90 is able to use a Web page control panel to customize data delivery for his/her company, and for each student in the company. This allows the client administrator to specify how the data is displayed, as well as what data is displayed, which ensures that data delivery is always formatted in the most efficient manner for each site.

Figure 13:
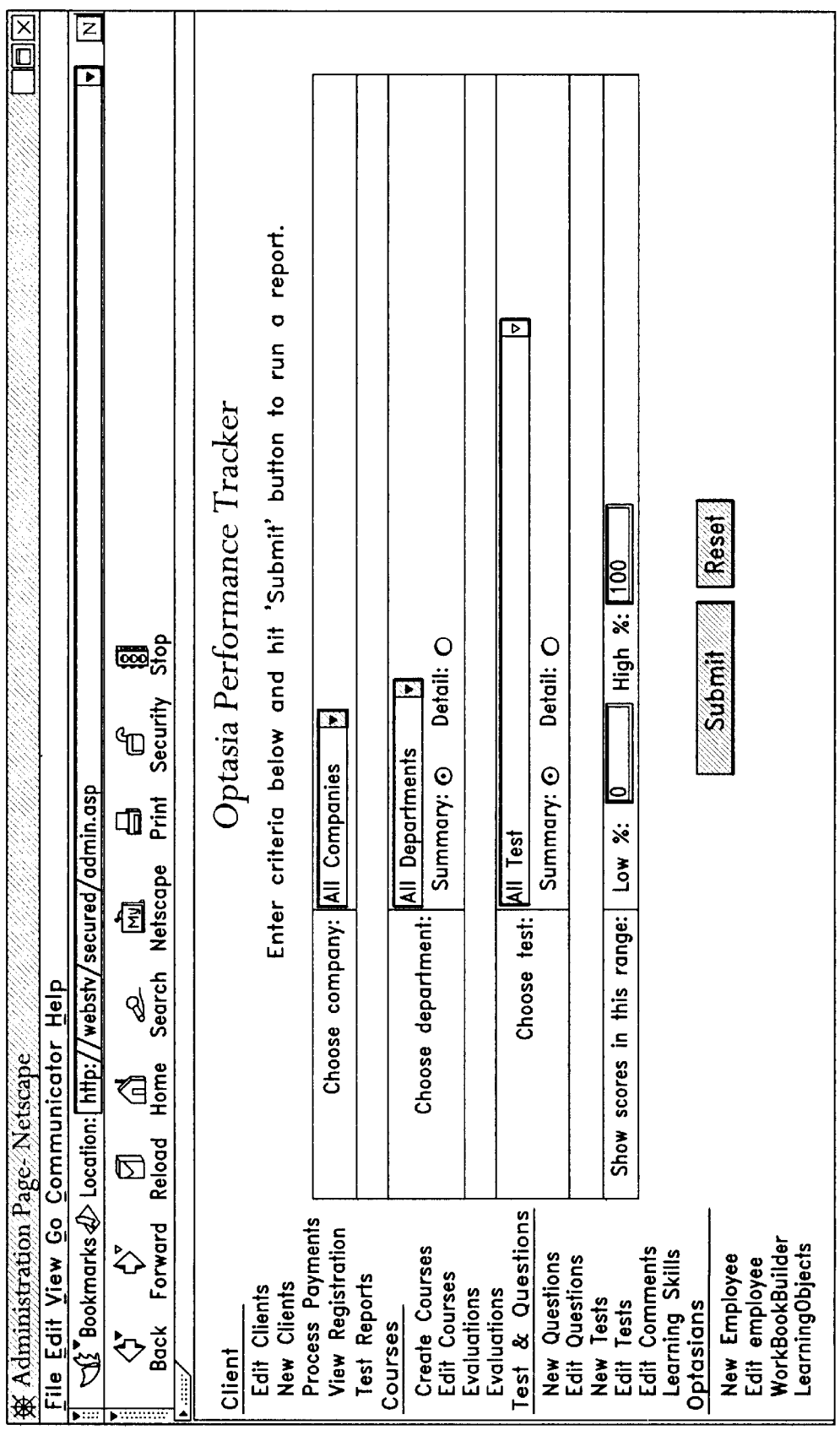
FIG. 13 is a display screen of the test administrator station reporting interface.

Reports are generated automatically or on-demand to show a client's (i.e., a company's) overall score, individual employees' test scores, account status, course registration, participation and fulfillment of courses, and current ranking compared to other clients regionally, nationally, and overall that are taking the same course (FIG. 13). Automated "report cards" are generated on a monthly basis and sent dynamically to an Amtech "personal care representative" (see customer care representative station 78, FIG. 7) to track a company's training progress and the on-site company's manager to keep them appraised of how their employees are doing with the training process.

Scores are tracked overtime and the test-scoring scripts engine 76 is designed also to pro-actively send warnings (although not shown, via e-mail) to on-site managers and Optasia staff if a student or group of students perform poorly on one or more exams. This allows the on-site company to track its own progress and immediately adjust for an employee's poor performance and also allows Optasia staff to evaluate the content and method of each course to make sure all material is presented properly. Trend analysis shows if a course is ineffective so that adjustments can be made immediately.

Reporting from the database is allowed in any variety of combinations for Optasia representatives or company managers. Students are given information only pertaining to them.

A portion of the Optasia Web site is designated for internal use only. This area allows Optasia representatives to manage student and site accounts, build custom exams for each course on the fly, generate course content workbooks (described in detail below) track and analyze test result data, and generate detailed reports from the data which are formatted and sorted according to the administrator's specifications. The flexibility and control of this reporting ensures that clients and students are receiving maximum benefit from the courses and that course content and delivery can be modified immediately if a problem is discovered.

Figure 15:
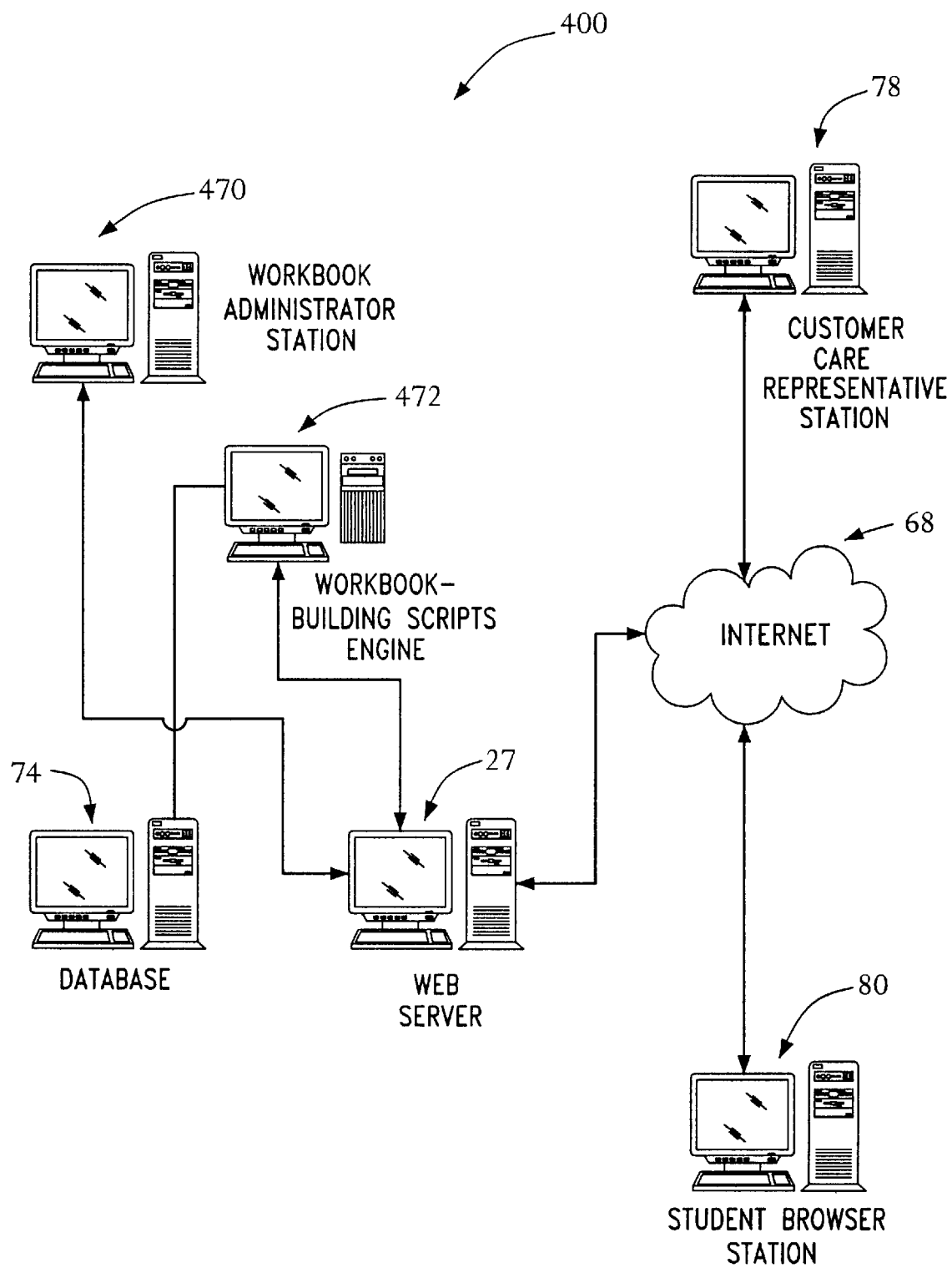
FIG. 15 is a functional diagram of the workbook building system of the present invention.

As mentioned previously, workbooks for the students are available through the Web site, and in particular, through a workbook building system 400 (FIG. 15). The workbook building system 400 comprises a workbook administrator station 470 and a workbook-building scripts engine 472, as well as the database 74, the Web server 27, the customer care representative station 78, the Internet 68 and the student browser station 80. Like the test or examination building described earlier, the workbooks are not stored per se by the workbook building system 400; rather, a workbook is "assembled" or "built". In particular, the workbook building system 400 allows an instructor, or other authorized administrator, to build and edit database-driven course material that is viewable by a student on-line through the virtual classroom and printable as one complete document. Links can be generated for "Graphics," "Help Text," "other HTML pages," "Multimedia material and audio" while a series of forms allow the administrator to input textual content directly. All textual content and links to other source files are stored systematically in the database 74. The workbook-building scripts engine 472 contains a series of scripts which interface to the workbook database to create workbook pages on-demand. Pages are built dynamically as they are requested, either as viewable, hot-linked Web pages or as one, complete, printable document. The workbook database in database 74 is also dynamically linked to the other databases for cross-referencing.

The Learning Center icon of the University Lobby Web-site (FIG. 5), also contains links to post-lecture examinations and the student table of the database 74. When a student clicks on one of the virtual laptops presented in the Learning Center, another "virtual terminal" (not shown) appears which prompts the student for a user name and password. The username is then referenced in the database 74 and brings back a full list of the exams that the student has taken, with his/her scores and relative ranking versus other students, listed by region and overall standing. The student is also presented with a list of exams that he/she has not taken, which he/she may choose to take at that point. The exams are generated on the fly via the exam table on the database 74.

Figure 16:
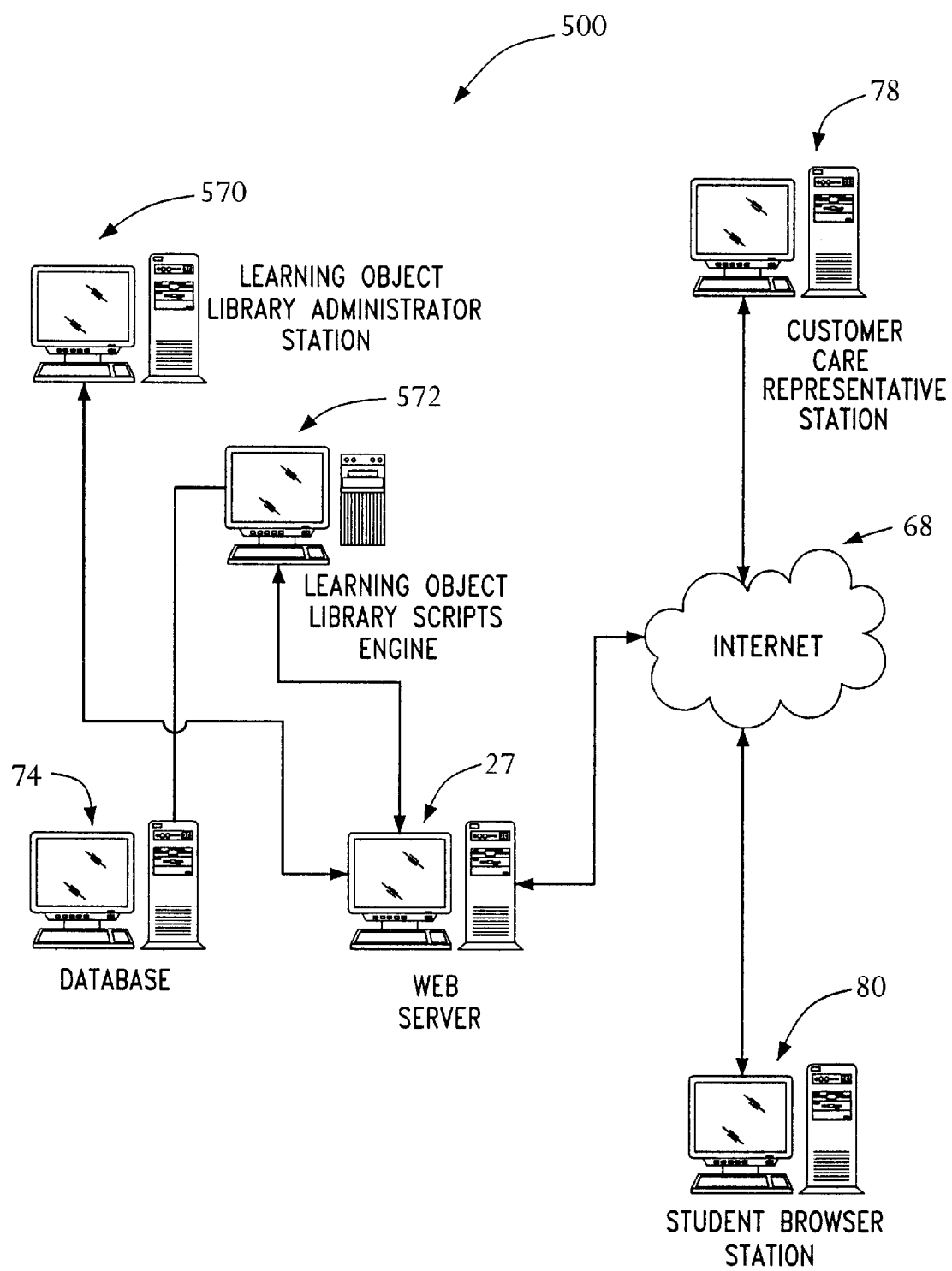
FIG. 16 is a functional diagram of the Learning Objects Library of the present invention.

Another important feature of the present invention 20 is the Learning Objects Library 500 (FIG. 16). The Learning Objects Library 500 acts both as an educational tool and as means for linking objects to test questions. As an educational tool, the Learning Objects Library 500 permits end users to obtain additional information about all aspects of the system 20, the course(s) that the end user is taking, etc. In particular, the Learning Objects Library 500 provides for on-demand delivery of learning reinforcement to the end user through the use of audio, video, animation, text, Web pages and other interactive multimedia. The Library 500 stores and catalogs such learning reinforcement media, known as "Learning Objects" in a Learning Object database (as part of the database 74). Thus, the Learning Objects Library 500 is effectively a stand-alone, comprehensive multi-media information-providing mechanism that is available to the end user through the Web server 26 at any time (e.g., during the live interactive instruction discussed earlier or whenever the end user is on-line). As a means for linking objects to test questions, the Learning Objects Library 500 interfaces with the examination building/delivery/score tracking system 100

(FIG. 7). As a result, when an end user takes a test and the test is instantaneously evaluated and reported back to the end user (as discussed previously), the end user is provided with the correct answers as well as links to reasons for the correct answers through the Learning Objects Library 500. Therefore, if the end user wants to see why a certain answer is correct, he/she can click on that answer and the Learning Objects Library 500 links the end user to a full explanation and/or discussion about that answer.

Learning Object developers create video Learning Objects through the use screen-capturing software on a multimedia-capable personal computer (PC) to record interaction with the software application (e.g., Imaginera) package. As the representative manipulates the software with keystrokes and mouse-clicks, all actions are recorded to a video file on that PC's hard drive. The representative also narrates his/her movements into a microphone attached to the PC which records the representative's narrative and synchronizes it with the video being recorded. The end result is an on-screen demonstration of the software application with voice-over narrative.

Also available through the Optasia Web site are all the workbooks and associated documentation that go with any given course, and a Message Board interface that allows students to consult with experts or to consult with other students in real-time via the Internet, either through live chat rooms, or posted newsgroup discussions.

All video tutorials are recorded and archived for future use. The video tutorials are also segmented and made available via the Optasia Web site as tutorials (e.g., learning objects) and the entire series is then made available via CD-ROM or DVD-ROM for offline training.

These and other Learning Objects are archived and indexed in the Learning Object database (as part of the database 74) to create the Learning Object Library in conjunction with user-level and administrative-level forms and the Learning Object Library scripts engine 572. The Learning Object Library 500 is available to end users for on-demand retrieval and playback over a broadband network, such as but not limited to, the Internet, an intranet, a local area network, or a wide area network, and utilizes streaming media technology for real-time interaction with the Learning Object Library 500.

An administrative interface (e.g., via a Learning Object Library administrator station 570) forms and scripts allow an authorized user to create Learning Objects, generate a profile of keywords, description, course and class relevance, exam and question relevance (included answers to each question), associated files and graphics and other criteria and to update the Learning Object database via the broadband network. In particular, although not shown, data fields in the Question Builder form allow the authorized user to select the appropriate links. As with the examination building/delivery/score tracking system 100 (FIG. 7), the client level account management system 200 (FIG. 9A), the student level account management system 300 (FIG. 9B), and the workbook building system 400 (FIG. 15), the Learning Objects Library 500 also comprises the customer care representative station 78, the Internet 68 and the student browser station 80, with the Web server 27 acting as the gateway.

User interface forms and scripts provide the capability for searching for a Learning Object by course, class, keyword, description and other criteria, and to be delivered on demand via streaming media technology. As stated earlier, Learning Objects are also linked to exam questions for explanation of a correct answer to be delivered in response to an incorrect answer shown on a graded exam.

With respect to "E-Commerce", (electronic commerce), a site administrator must develop a roster of eligible students and requested courses prior to registration of students in the courses. When a client requests an account be initiated for them, the Optasia database administrator activates the client's account. The site administrator then adds students and chooses the courses to be studied. Upon submission of the roster, the client has the option of printing an invoice and submitting a corporate purchase order, or the client can pay for its courses immediately via credit card and receive notification via e-mail. As a result, the client's students are then eligible to take the course immediately.

It is within the broadest scope of this invention to include a "leased-learning" model, which enables sites to pay for tutorials and access to the learning objects individually on an as-needed basis.

The interface and animation used at the Optasia Web site has been created using third party development tools such as, but not limited to nor dependent upon, Macromedia Flash, Director, RealProducer, etc. and requires browser plug-ins or stand-alone players. None of these limit the implementation of the system 20 and are cited by way of example only.

Database integration is performed using SQL via Microsoft Active Server Pages, PERL, VBScript, JavaScript, and other Web-enabled server-side scripting languages. Database development uses Microsoft Access. None of these limit the implementation of the system 20 and are cited by way of example only.

Without further elaboration, the foregoing will so fully illustrate our invention that others may, by applying current or future knowledge, readily adopt the same for use under various conditions of service.

We claim:

1. A system for providing live interactive distance learning to at least one end user situated at a remote location, said system comprising:

a video recording means for producing a real-time video/audio signal of an instructor, at another location different from said remote location, against a blue background;

a video background generation means for providing at least one background signal of an instructional background;

a video mixer means, coupled to said video recording means and to said video background generation means, for combining said real-time video/audio signal with said at least one background signal to generate a real-time instruction video/audio signal which virtually positions said instructor in front of said instructional background;

first communication means coupled between said video mixer means and said remote location for transmitting said real-time instruction video/audio signal to said remote location;

at least one display positioned at said remote location for displaying said real-time instruction video/audio signal to end users at said remote location such that said instructor is depicted as being able to move around the at least one display in front of said instructional background;

a second display positioned at said another location, said second display being coupled to said video mixer means for displaying said real-time instruction video/audio signal to said instructor;

wherein said video background generation means comprises a software application station coupled to said video mixer means, said software application station running a software application thereat and providing said at least one background signal of said instructional background to said video mixer means, said instructional background being a display screen of said software application;

a computer end user workstation located at said remote location and wherein said computer end user workstation is operating said software application such that said computer end user workstation can modify said at least one background signal; and wherein said computer end user workstation is coupled to the Internet and wherein said software application station is also coupled to said Internet, said computer end user workstation and said software application station having respective sharing and collaboration software applications activated in order to permit said computer end user workstation to control the software application station.

2. A method for providing live interactive distance learning to at least one end user situated at a remote location, the method comprising the steps of:

video-recording an instructor positioned against a blue background, at another location different from said remote location, to generate a real-time video/audio signal;

mixing said real-time video/audio signal with a video background signal representative of an instructional background to generate a real-time instruction video/audio signal that virtually positions said instructor in front of said instructional background such that said instructor is depicted as being able to move around in front of said instructional background;

transmitting said real-time instruction video/audio signal to said remote location;

displaying said real-time instruction video/audio signal to end users at said remote location and to said instructor at said another location;

wherein said instructional background is a screen display of a software application that is operating on a first computer at said remote location and that is operating on a second computer at said another location; and linking said first computer and said second computer over a communication network using sharing and collaboration software on each of said computers to permit end users at said remote location to drive said software application operating on said first and second computers.

* * * * *